United States Patent
Powell et al.

(10) Patent No.: US 10,346,784 B1
(45) Date of Patent: Jul. 9, 2019

(54) NEAR-TERM DELIVERY SYSTEM PERFORMANCE SIMULATION

(71) Applicant: Google Inc., Mountain View, CA (US)

(72) Inventors: James Powell, Pittsburgh, PA (US); Michael Nathan Nonemacher, Soquel, CA (US); Haakan Younes, Pittsburgh, PA (US); Brandon Kyle Trew, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 1172 days.

(21) Appl. No.: 14/176,124

(22) Filed: Feb. 9, 2014

Related U.S. Application Data

(63) Continuation-in-part of application No. 13/953,736, filed on Jul. 29, 2013, now abandoned.
(Continued)

(51) Int. Cl.
*G06Q 10/06* (2012.01)

(52) U.S. Cl.
CPC .............................. *G06Q 10/0639* (2013.01)

(58) Field of Classification Search
CPC .................................................. G06Q 10/0639
See application file for complete search history.

(56) References Cited

U.S. PATENT DOCUMENTS

| | | |
|---|---|---|
| 3,652,836 A | 3/1972 | Richardson et al. |
| 4,336,589 A | 6/1982 | Smith et al. |

(Continued)

FOREIGN PATENT DOCUMENTS

| | | |
|---|---|---|
| CN | 101593320 A | 12/2009 |
| WO | WO 2000/68856 A2 | 11/2000 |

(Continued)

OTHER PUBLICATIONS

Mitrovic-Minic, Snezana, The Dynamic Pickup and Delivery Problem With Time Windows, Simon Fraser University, Nov. 2001.*
(Continued)

*Primary Examiner* — Nathan Erb
(74) *Attorney, Agent, or Firm* — Johnson, Marcou & Isaacs, LLC

(57) ABSTRACT

Receiving an event queue including unprocessed delivery events, each characterized by an event time. Iteratively, until a stopping condition, for an unprocessed event from the queue, setting a simulation time to the earliest event time; processing the unprocessed event; determining at least one simulated performance measure based on characteristics of system agents over the simulation period; and transmitting the determined performance measure for display. Where unprocessed event is a route planning event, processing includes requesting, and receiving, route planning from a shipping system of the near-term delivery system. Processing further comprises identifying events derivative from the unprocessed event, and adding the identified derivative events to the event queue. Processing further comprises updating the status of each agent as a function of derivative events and received route planning information. The updated status is reported to the shipping system, and the technology determines whether the stopping condition obtains.

20 Claims, 9 Drawing Sheets

Related U.S. Application Data

(60) Provisional application No. 61/676,838, filed on Jul. 27, 2012, provisional application No. 61/773,132, filed on Mar. 5, 2013.

(56) References Cited

U.S. PATENT DOCUMENTS

| | | | |
|---|---|---|---|
| 5,177,684 A | 1/1993 | Harker et al. | |
| 5,517,663 A * | 5/1996 | Kahn | G06F 3/0481 |
| | | | 345/473 |
| 5,835,376 A | 11/1998 | Smith et al. | |
| 5,845,227 A * | 12/1998 | Peterson | G01C 21/3492 |
| | | | 340/905 |
| 5,863,203 A * | 1/1999 | Bragdon | G09B 9/04 |
| | | | 434/29 |
| 5,880,958 A * | 3/1999 | Helms | G08G 1/202 |
| | | | 340/991 |
| 5,922,040 A | 7/1999 | Prabhakaran | |
| 6,261,100 B1 * | 7/2001 | Bragdon | G09B 9/04 |
| | | | 434/29 |
| 6,278,936 B1 | 8/2001 | Jones | |
| 6,317,686 B1 * | 11/2001 | Ran | G01C 21/3691 |
| | | | 701/117 |
| 6,510,384 B2 | 1/2003 | Okano | |
| 6,529,821 B2 | 3/2003 | Tamasi et al. | |
| 6,622,127 B1 | 9/2003 | Kiots et al. | |
| 6,701,299 B2 | 3/2004 | Kraisser et al. | |
| 6,862,572 B1 | 3/2005 | de Sylva | |
| 6,871,184 B1 | 3/2005 | Liberman | |
| 6,929,181 B1 | 8/2005 | Oswalt et al. | |
| 6,963,847 B1 | 11/2005 | Kennedy et al. | |
| 6,970,837 B1 | 11/2005 | Walker et al. | |
| 7,117,163 B1 | 10/2006 | Iyer et al. | |
| 7,139,721 B2 | 11/2006 | Borders et al. | |
| 7,177,825 B1 | 2/2007 | Borders et al. | |
| 7,209,887 B2 | 4/2007 | Yen et al. | |
| 7,222,081 B1 | 5/2007 | Sone | |
| 7,233,907 B2 | 6/2007 | Young | |
| 7,233,914 B1 | 6/2007 | Wijaya et al. | |
| 7,246,084 B1 | 7/2007 | Javangula et al. | |
| 7,248,160 B2 | 7/2007 | Mangan et al. | |
| 7,249,044 B2 | 7/2007 | Kumar et al. | |
| 7,251,621 B1 | 7/2007 | Weng | |
| 7,257,552 B1 | 8/2007 | Franco | |
| 7,295,990 B1 | 11/2007 | Braumoeller et al. | |
| 7,328,168 B2 | 2/2008 | Watanabe et al. | |
| 7,346,564 B1 | 3/2008 | Kirklin et al. | |
| 7,346,654 B1 | 3/2008 | Kirklin et al. | |
| 7,363,126 B1 | 4/2008 | Zhong et al. | |
| 7,370,001 B2 | 5/2008 | Harris | |
| 7,409,371 B1 | 8/2008 | Heckerman et al. | |
| 7,487,105 B2 | 2/2009 | Jacobs et al. | |
| 7,516,082 B2 | 4/2009 | Sanville et al. | |
| 7,558,747 B2 | 7/2009 | Javangula et al. | |
| 7,580,862 B1 | 8/2009 | Montelo et al. | |
| 7,587,345 B2 | 9/2009 | Mann et al. | |
| 7,610,254 B2 | 10/2009 | Von Helmolt et al. | |
| 7,624,024 B2 | 11/2009 | Levis et al. | |
| 7,644,019 B2 | 1/2010 | Woda et al. | |
| 7,668,761 B2 | 2/2010 | Jenkins et al. | |
| 7,693,653 B2 | 4/2010 | Hussain et al. | |
| 7,707,070 B2 | 4/2010 | Finke et al. | |
| 7,747,543 B1 | 6/2010 | Braumoeller et al. | |
| 7,765,131 B2 | 7/2010 | Klingenberg et al. | |
| 7,778,773 B2 | 8/2010 | Yaqub et al. | |
| 7,797,204 B2 | 9/2010 | Balent | |
| 7,818,317 B1 | 10/2010 | Emigh et al. | |
| 7,828,202 B2 * | 11/2010 | Bregman | G06Q 10/087 |
| | | | 235/376 |
| 7,860,738 B2 | 12/2010 | Simon et al. | |
| 7,904,240 B2 | 3/2011 | Nortrup | |
| 7,925,514 B2 | 4/2011 | Williams et al. | |
| 7,946,474 B1 | 5/2011 | Agrawal | |
| 7,957,997 B2 | 6/2011 | Von Helmolt et al. | |
| 8,078,485 B1 | 12/2011 | Kraehmueller et al. | |
| 8,090,626 B1 | 1/2012 | Wijaya et al. | |
| 8,112,317 B1 | 2/2012 | Ballaro et al. | |
| 8,131,607 B2 | 3/2012 | Park et al. | |
| 8,135,629 B2 | 3/2012 | Fuzell-Casey et al. | |
| 8,231,049 B2 | 7/2012 | Agrawal | |
| 8,244,226 B2 | 8/2012 | Werner et al. | |
| 8,249,955 B2 | 8/2012 | Gross | |
| 8,285,573 B1 | 10/2012 | Ballaro et al. | |
| 8,396,762 B2 | 3/2013 | Esau et al. | |
| 8,438,118 B2 | 5/2013 | Ho | |
| 8,473,326 B1 | 6/2013 | Griffith et al. | |
| 8,478,649 B2 | 7/2013 | Von Hlemolt et al. | |
| 8,494,925 B2 | 7/2013 | Huber-Buschbeck et al. | |
| 8,504,388 B2 | 8/2013 | Seul et al. | |
| 8,515,791 B2 | 8/2013 | Woda et al. | |
| 8,515,822 B2 | 8/2013 | Angert et al. | |
| 8,527,371 B2 | 9/2013 | Aoyama et al. | |
| 8,538,677 B2 | 9/2013 | Gutman | |
| 8,600,913 B2 | 12/2013 | Williams et al. | |
| 8,676,667 B1 * | 3/2014 | Paiz | G06Q 10/04 |
| | | | 705/14.49 |
| 8,682,883 B2 | 3/2014 | Williams et al. | |
| 8,683,883 B2 | 3/2014 | Williams et al. | |
| 8,700,487 B2 | 4/2014 | Grass et al. | |
| 8,751,334 B2 | 6/2014 | Wijaya et al. | |
| 8,815,031 B2 | 8/2014 | Olsen et al. | |
| 8,827,151 B2 | 9/2014 | Agrawal | |
| 8,886,453 B2 * | 11/2014 | Cerecke | G01C 21/3446 |
| | | | 701/422 |
| 8,924,049 B2 * | 12/2014 | Kumar | B61L 27/0027 |
| | | | 701/19 |
| 9,441,980 B2 | 9/2016 | Corne et al. | |
| 9,470,546 B2 | 10/2016 | Nakahara et al. | |
| 9,702,719 B2 * | 7/2017 | Mason | G01C 21/3469 |
| 2001/0042024 A1 | 11/2001 | Rogers | |
| 2001/0042285 A1 | 11/2001 | Seon et al. | |
| 2002/0042756 A1 | 4/2002 | Kumar et al. | |
| 2002/0046073 A1 | 4/2002 | Indseth et al. | |
| 2002/0077929 A1 | 6/2002 | Knorr et al. | |
| 2002/0077937 A1 | 6/2002 | Lyons | |
| 2002/0082772 A1 | 6/2002 | Okano | |
| 2002/0095307 A1 | 7/2002 | Greamo et al. | |
| 2002/0103786 A1 | 8/2002 | Goel | |
| 2002/0107769 A1 | 8/2002 | Dashefsky et al. | |
| 2002/0147654 A1 | 10/2002 | Kraisser et al. | |
| 2002/0152128 A1 | 10/2002 | Watch et al. | |
| 2002/0165668 A1 | 11/2002 | Yamashita et al. | |
| 2002/0188499 A1 | 12/2002 | Jenkins et al. | |
| 2003/0036938 A1 | 2/2003 | Dutta et al. | |
| 2003/0060924 A1 | 3/2003 | Ye et al. | |
| 2003/0078873 A1 | 4/2003 | Cohen | |
| 2003/0084011 A1 | 5/2003 | Shetty | |
| 2003/0135304 A1 * | 7/2003 | Sroub | G06Q 10/08 |
| | | | 701/1 |
| 2003/0158765 A1 | 8/2003 | Ngi et al. | |
| 2003/0158772 A1 | 8/2003 | Harris | |
| 2003/0171962 A1 | 9/2003 | Hirth et al. | |
| 2003/0177072 A1 | 9/2003 | Bared | |
| 2003/0204468 A1 | 10/2003 | Mitsukuni et al. | |
| 2004/0010454 A1 | 1/2004 | Helmolt et al. | |
| 2004/0030572 A1 | 2/2004 | Campbell et al. | |
| 2004/0030604 A1 | 2/2004 | Young | |
| 2004/0039597 A1 | 2/2004 | Barts et al. | |
| 2004/0054467 A1 | 3/2004 | Sakai et al. | |
| 2004/0088392 A1 * | 5/2004 | Barrett | G01C 21/26 |
| | | | 709/223 |
| 2004/0210527 A1 | 10/2004 | Grass et al. | |
| 2005/0038758 A1 | 2/2005 | Hilbush et al. | |
| 2005/0119786 A1 | 6/2005 | Kadaba | |
| 2005/0149414 A1 | 7/2005 | Schrodt et al. | |
| 2005/0216553 A1 * | 9/2005 | Mallonee | G06Q 10/08 |
| | | | 709/203 |
| 2005/0256812 A1 | 11/2005 | Yuill | |
| 2006/0031177 A1 | 2/2006 | Rule | |
| 2006/0046740 A1 | 3/2006 | Johnson et al. | |
| 2006/0064235 A1 | 3/2006 | Ishikawa et al. | |
| 2006/0085250 A1 | 4/2006 | Kantarjiev et al. | |
| 2006/0089787 A1 | 4/2006 | Burr et al. | |
| 2006/0116905 A1 | 6/2006 | Yered et al. | |

(56) References Cited

U.S. PATENT DOCUMENTS

| | | |
|---|---|---|
| 2006/0190348 A1 | 8/2006 | Ofer et al. |
| 2006/0190360 A1* | 8/2006 | Bregman ............... G06Q 10/08 705/28 |
| 2006/0235739 A1 | 10/2006 | Levis et al. |
| 2006/0238334 A1 | 10/2006 | Mangan et al. |
| 2006/0238406 A1 | 10/2006 | Nohara et al. |
| 2007/0027593 A1* | 2/2007 | Shah ..................... B60W 50/00 701/29.4 |
| 2007/0050233 A1 | 3/2007 | Doerfler et al. |
| 2007/0106412 A1 | 5/2007 | Esau et al. |
| 2007/0129984 A1 | 6/2007 | von Helmolt et al. |
| 2007/0129985 A1 | 6/2007 | Helmolt et al. |
| 2007/0174144 A1 | 7/2007 | Borders et al. |
| 2007/0192212 A1 | 8/2007 | Javangula et al. |
| 2007/0223671 A1 | 9/2007 | Lee |
| 2007/0233362 A1 | 10/2007 | Carriker et al. |
| 2007/0233576 A1 | 10/2007 | Finke et al. |
| 2007/0294028 A1 | 12/2007 | Gray et al. |
| 2008/0040190 A1 | 2/2008 | Khosla et al. |
| 2008/0102851 A1 | 5/2008 | Bodnar |
| 2008/0126164 A1 | 5/2008 | Jaeck |
| 2008/0147473 A1* | 6/2008 | Zhong ................ G01C 21/3484 701/25 |
| 2008/0154838 A1 | 6/2008 | Watford et al. |
| 2008/0183599 A1 | 7/2008 | Hill et al. |
| 2008/0190348 A1 | 8/2008 | Baker |
| 2008/0195270 A1 | 8/2008 | Diekhans et al. |
| 2008/0275643 A1* | 11/2008 | Yaqub ................. G01C 21/343 701/412 |
| 2008/0306795 A1 | 12/2008 | Ho |
| 2008/0319822 A1 | 12/2008 | LaJoie et al. |
| 2009/0043498 A1 | 2/2009 | Maethner |
| 2009/0045924 A1 | 2/2009 | Roberts et al. |
| 2009/0048850 A1 | 2/2009 | Liebchen |
| 2009/0048890 A1* | 2/2009 | Burgh ................... G06Q 10/04 705/7.15 |
| 2009/0076933 A1 | 3/2009 | Park et al. |
| 2009/0119160 A1 | 5/2009 | Woda et al. |
| 2009/0187446 A1 | 7/2009 | Dewar |
| 2009/0288091 A1 | 11/2009 | Papadakos |
| 2009/0326971 A1 | 12/2009 | Piccinini et al. |
| 2010/0088146 A1* | 4/2010 | Zhong ................ G01C 21/3484 701/25 |
| 2010/0094688 A1 | 4/2010 | Olsen et al. |
| 2010/0191412 A1 | 7/2010 | Kim |
| 2010/0268620 A1 | 10/2010 | Angert et al. |
| 2010/0299177 A1* | 11/2010 | Buczkowski .......... G06Q 10/06 705/7.13 |
| 2011/0047092 A1 | 2/2011 | Taylor |
| 2011/0090399 A1 | 4/2011 | Whitaker et al. |
| 2011/0125566 A1 | 5/2011 | McLaughlin et al. |
| 2011/0225087 A1 | 9/2011 | Agrawal |
| 2011/0258135 A1 | 10/2011 | Paul et al. |
| 2012/0030134 A1 | 2/2012 | Campbell et al. |
| 2012/0053970 A1 | 3/2012 | Bhamidipaty et al. |
| 2012/0078673 A1 | 3/2012 | Koke et al. |
| 2012/0095879 A1 | 4/2012 | Wijaya |
| 2012/0158608 A1* | 6/2012 | Arunapuram .......... G06Q 10/00 705/334 |
| 2012/0253908 A1 | 10/2012 | Ouimet et al. |
| 2012/0277940 A1* | 11/2012 | Kumar ................ B61L 27/0027 701/20 |
| 2012/0284090 A1 | 11/2012 | Marins et al. |
| 2012/0290496 A1 | 11/2012 | Park et al. |
| 2013/0030915 A1 | 1/2013 | Statler et al. |
| 2013/0046526 A1* | 2/2013 | Yucel ................. G01C 21/3469 703/8 |
| 2013/0059607 A1 | 3/2013 | Herz et al. |
| 2013/0080347 A1 | 3/2013 | Paul et al. |
| 2013/0159144 A1 | 6/2013 | Higgins et al. |
| 2013/0198042 A1 | 8/2013 | Seifen |
| 2013/0204744 A1 | 8/2013 | Grass et al. |
| 2013/0204774 A1 | 8/2013 | Grass et al. |
| 2013/0297457 A1 | 11/2013 | Zhu |
| 2013/0309645 A1 | 11/2013 | Billinge |
| 2013/0325592 A1 | 12/2013 | Woda et al. |
| 2014/0006090 A1 | 1/2014 | Agrawal |
| 2014/0074743 A1 | 3/2014 | Rademaker |
| 2014/0132767 A1* | 5/2014 | Sonnabend ............ G08G 1/144 348/148 |
| 2014/0324725 A1 | 10/2014 | Edmonds et al. |
| 2015/0005994 A1* | 1/2015 | Kumar ................ B61L 27/0027 701/20 |
| 2015/0185033 A1 | 7/2015 | Corne et al. |
| 2015/0206093 A1 | 7/2015 | Trew et al. |
| 2017/0307391 A1* | 10/2017 | Mason ............. G06Q 10/06311 |

FOREIGN PATENT DOCUMENTS

| | | |
|---|---|---|
| WO | WO 2000/68859 A2 | 11/2000 |
| WO | WO 2011/154256 A1 | 12/2011 |

OTHER PUBLICATIONS

Tao, Yu-Hui, A Framework for Computer-Assisted Simulation Experiment Design and Analysis, The Ohio State University, 1995, pp. 50-51.*

U.S. Appl. No. 14/055,849 to Trew et al. filed Oct. 16, 2013.

U.S. Appl. No. 13/953,736 to Trew et al. filed Jul. 29, 2013.

U.S. Appl. No. 14/039,132 to Trew et al. filed Sep. 27, 2013.

U.S. Appl. No. 14/055,552 to Trew et al. filed Oct. 16, 2013.

U.S. Appl. No. 14/055,857 to Trew et al. filed Oct. 16, 2013.

U.S. Appl. No. 14/145,011 to Nonemacher et al. filed Dec. 31, 2013.

U.S. Appl. No. 14/107,707 to Powell et al. filed Dec. 16, 2013.

U.S. Appl. No. 14/165,515 to Powell et al. filed Jan. 27, 2014.

U.S. Appl. No. 14/162,730 to Powell et al. filed Jan. 23, 2014.

U.S. Appl. No. 14/316,481 to Reese filed Jun. 26, 2014.

"U.S. Office Action issued in copending U.S. Appl. No. 13/953,736, filed Jul. 29, 2013", dated Aug. 24, 2017, 13 pages.

"U.S. Office Action issued in copending U.S. Appl. No. 14/107,707, filed Dec. 16, 2013", dated Aug. 25, 2017, 9 pages.

"U.S. Office Action issued in copending U.S. Appl. No. 14/039,132, filed Sep. 27, 2013", dated Nov. 14, 2017, 17 pages.

Haughton, "An Alternative Tactic to Deal With the Contingency of Driver Absenteeism," The Journal of the Operational Research Society, 60.9, Sep. 2009, 7 pages.

"U.S. Office Action issued in copending U.S. Appl. No. 13/953,736, filed Jul. 29, 2013", dated Feb. 22, 2017, 14 pages.

Fickes, "The Weight of the World", Waste Age, 32.2, 56, Penton Media Inc., Feb. 2001, 6 pages.

Thomson, "Dr. Gridlock: Metro Problems, Snow Delays and Holiday Weekend Travel Trips", Washington post.com, Washingtonpost Newsweek Interactive, Dec. 21, 2009, 16 pages.

Wikipedia "Monte Carlo Method", www.wikipedia.org, version of article dated Jun. 30, 2011, 14 pages.

Author: Title: e-Fulfillment Solutions—DeliveryNet for Home Delivery Publ: Descartes.com/Solutions (Retrieved from Archive.org Mar. 20, 2000) vol./Iss: pp. 1-9 Date: Mar. 20, 2000.

Author: Title: Road Net—Daily Route Editor Publ: RoadNet Technologies, Inc.—United Parcel Service of America, Inc. vol./Iss: pp. 1-116 Date: Jan. 1, 1996.

Author: Title: User's Guide to Roadnet 5000—Routing and Scheduling System—Ver. 5.6 Publ: Roadnet Technologies vol./Iss: pp. 1-735 Date: Jan. 1, 1996.

Author: Bent et al. Title: Scenario-Based Planning for Partially Dynamic Vehicle Routing with Stochastic Customers vol./Iss: 52(6) pp. 977-987 Date: Nov. 1, 2004.

Author: Braysy et al. Title: Vehicle Routing Problem with Time Windows, Part II: Metaheuristics Publ: Transportation Science vol./Iss:39(1) pp. 119-139 Date: Feb. 1, 2005.

Author: Braysy et al. Title: Vehicle Routing Problem with Time Windows, Part I: Route Construction and Local Search Algorithm Publ: Transportation Science vol./Iss:39(1) pp. 1-29 Date: Feb. 1, 2005.

Author: Brown, Stuart Title: How e-tailers Delivery within Hours Publ: Fortune vol./Iss:141(11) pp. 1-5 Date: May 29, 2000.

(56) References Cited

OTHER PUBLICATIONS

Author: Chang et al. Title: Oracle Global Order Promising Release 11/ Publ: vol./Iss: pp. 1-480 Date: Jun. 1, 2004.
Author: Chen Title: Simulation and Optimization of Immediate Delivery Networks Publ: Massachusetts Institute of Technology—Thesis vol./Iss: pp. 1-70 Date: May 23, 2001.
Author: Erb, N. Title: Office Action issued in copending U.S. Appl. No. 14/055,857, filed Oct. 16, 2013 Publ: vol./Iss: pp. 1-12 dated Sep. 16, 2014.
Author: Erb, N. Title: Office Action issued in copending U.S. Appl. No. 14/055,857, filed Oct. 16, 2013 Publ: vol./Iss: pp. 1-7 dated Mar. 6, 2014.
Author: Gendreau et al. Title: Neighborhood Search Heuristics for a Dynamic Vehicle Dispatching Problem wiht Pick-ups and Deliveries Publ: vol./Iss: pp. 157-174 Date: Jun. 1, 2006.
Author: Hasle et al. Title: Industrial Vehicle Routing Publ: Geometric Modelling, Numerical Simulation, and Optimization vol./Iss: pp. 1-40 Date: Jan. 1, 2007.
Author: Hyytia et al. Title: Simulation of a Large Scale Dynamic Pickup and Delivery Problem Publ: ICST vol./Iss: pp. 1-10 Date: Jan. 1, 2010.
Author: Jackson et al. Title: A Combined Tabu Search and 2-opt Heuristic for Multiple Vehicle Routing Publ: 2010 American Control Conference vol./Iss: pp. 1-6 Date: Jun. 30, 2010.
Author: Jarrett, S. Title: Office Action issued in copending U.S. Appl. No. 14/055,552, filed Oct. 16, 2013 vol./Iss: pp. 1-14 dated Dec. 6, 2013.
Author: Jarrett, S. Title: Office Action issued in copending U.S. Appl. No. 14/055,552, filed Oct. 16, 2013 vol./Iss: pp. 1-16 dated Oct. 10, 2014.
Author: Jarrett, S. Title: Office Action issued in copending U.S. Appl. No. 14/055,849, filed Oct. 16, 2013 Publ: vol./Iss: pp. 1-9 dated Oct. 8, 2014.
Author: Jarrett, S. Title: Office Action issued in copending U.S. Appl. No. 14/055,849, filed Oct. 16, 2013 Publ: vol./Iss: pp. 1-25 dated Apr. 11, 2014.
Author: Jarrett, S. Title: Office Action issued in copending U.S. Appl. No. 14/055,552, filed Oct. 16, 2013 vol./Iss: pp. 1-20 dated Mar. 19, 2014.
Author: Jarrett, S. L. Title: Office Action issued in copending U.S. Appl. No. 14/055,849, filed Oct. 16, 2013 vol./Iss: pp. 1-18 dated Jan. 7, 2014.
Author: Lau et al. Title: Vehicle Routing Problem with Time Windows and a Limited Number of Vehicles Publ: European Journal of Operational Research vol./Iss:148 pp. 559-569 Date: Jan. 1, 2003.
Author: Murphy, Jean V. Title: Webvan: Rewriting the Rules on 'Last Mile' Delivery Publ: SupplyChainBrain.com—Global Logistics & Supply Chain Strategies vol./Iss: pp. 1-10 Date: Aug. 1, 2000.
Author: Pillac et al. Title: An Event-Driven Optimization Framework for Dynamic Vehicle Routing Publ: Ecole des Mines de Nantes—France vol./Iss: pp. 1-19 Date: Jun. 1, 2011.
Author: Pradhan et al. Title: Global Available-to-Promise with SAP Publ: vol./Iss: pp. 1-48 Date: Oct. 1, 2011.
Author: Savelsbergh et al. Title: Drive: Dynamic Routing of Independent Vehicles Publ: Operations Research vol./Iss:46(4) pp. 474-490 Date: Jul. 1, 1998.
Author: Siri Title: Oracle Order Management—Release 11/ Publ: vol./Iss: pp. 1-410 Date: Aug. 1, 2002.
Author: Smith, S. L. Title: Task Allocation and Vehicle Routing in Dynamic Environments Publ: vol./Iss: pp. 1-183 Date: Sep. 1, 2009.
Author: Unknown Title: Descarte Route Planner Solutions Publ: Descartes vol./Iss: pp. 1-4 Date: Jan. 1, 2011.
Author: Unknown Title: Oracle Real-Time Scheduler For Retail Delivery and Logistics Publ: Oracle Data Sheet vol./Iss: pp. 1-5 Date: Jan. 1, 2009.
Author: Yang, J. Title: Real-Time Multi-Vehicle Truckload Pick-Up and Delivery Problems Publ: Transportation Science vol./Iss: pp. 1-34 Date: Dec. 1, 2002.

"U.S. Office Action issued in copending U.S. Appl. No. 13/953,736, filed Jul. 29, 2013", dated May 19, 2016, 11 pages.
"U.S. Office Action issued in copending U.S. Appl. No. 14/039,132, filed Sep. 27, 2013", dated Apr. 7, 2016, 6 pages.
Jarrett, "U.S. Office Action issued in copending U.S. Appl. No. 14/055,849, filed Oct. 16, 2013", dated Jun. 11, 2015, 10 pages.
Jarrett, "U.S. Office Action issued in copending U.S. Appl. No. 14/055,849, filed Oct. 16, 2013", dated Jan. 20, 2016, 12 pages.
Author: Erb, N. Title: Office Action issued in copending U.S. Appl. No. 13/953,736, filed Jul. 29, 2013 Publ: vol./Iss: pp. 1-10 dated Oct. 6, 2015.
Author: Erb, N. Title: Office Action issued in copending U.S. Appl. No. 14/055,857, filed Oct. 16, 2013 Publ: vol./Iss: pp. 1-9 dated Aug. 27, 2015.
Author: Jarrett, S. Title: Office Action issued in copending U.S. Appl. No. 14/055,552, filed Oct. 16, 2013 Publ: vol./Iss: pp. 1-16 dated Sep. 14, 2015.
Desai, "U.S. Office Action issued in copending U.S. Appl. No. 14/316,481, filed Jun. 26, 2014", dated Aug. 30, 2017, 20 pages.
"U.S. Office Action issued in copending U.S. Appl. No. 14/145,011, filed Dec. 31, 2013", dated Oct. 3, 2017, 11 pages.
"U.S. Office Action issued in copending U.S. Appl. No. 14/162,730, filed Jan. 23, 2014", dated Sep. 20, 2017, 11 pages.
"U.S. Office Action issued in copending U.S. Appl. No. 14/165,515, filed Jan. 27, 2014", dated Oct. 10, 2017, 7 pages.
Author: Erb, N. Title: Office Action issued in copending U.S. Appl. No. 14/055,857, filed Oct. 16, 2013 Publ: vol./Iss: pp. 1-8 dated Jan. 13, 2015.
Author: Jarrett, S. Title: Office Action issued in copending U.S. Appl. No. 14/055,552, filed Oct. 16, 2013 Publ: vol./Iss: pp. 1-13 dated Feb. 20, 2015.
Author: Jarrett, S. Title: Office Action issued in copending U.S. Appl. No. 14/055,849, filed Oct. 16, 2013 Publ: vol./Iss: pp. 1-11 dated Feb. 11, 2015.
"U.S. Office Action issued in copending U.S. Appl. No. 14/039,132, filed Sep. 27, 2013", dated Nov. 3, 2016, 8 pages.
Boyce, "U.S. Office Action issued in copending U.S. Appl. No. 14/055,849, filed Oct. 16, 2013", dated Dec. 28, 2016, 15 pages.
Jarrett, "U.S. Office Action issued in copending U.S. Appl. No. 14/055,849, filed Oct. 16, 2013", dated Jun. 28, 2016, 15 pages.
"U.S. Office Action issued in copending U.S. Appl. No. 14/145,011, filed Dec. 31, 2013", dated Mar. 7, 2017, 10 pages.
"U.S. Office Action issued in copending U.S. Appl. No. 14/162,730, filed Jan. 23, 2014", dated Mar. 14, 2017, 10 pages.
"U.S. Office Action issued in copending U.S. Appl. No. 14/145,011, filed Dec. 31, 2013", dated Jun. 26, 2018, 7 pages.
Desai, "U.S. Office Action issued in copending U.S. Appl. No. 14/316,481, filed Jun. 26, 2014", dated Mar. 9, 2018, 9 pages.
"U.S. Office Action issued in copending U.S. Appl. No. 14/107,707, filed Dec. 16, 2013", dated Mar. 20, 2018, 13 pages.
"U.S. Office Action issued in copending U.S. Appl. No. 13/953,736, filed Jul. 29, 2013", dated Apr. 3, 2018, 17 pages.
"U.S. Office Action issued in copending U.S. Appl. No. 14/039,132, filed Sep. 27, 2013", dated Apr. 3, 2018, 8 pages.
"U.S. Office Action issued in copending U.S. Appl. No. 14/162,730, filed Jan. 23, 2014", dated Apr. 3, 2018, 16 pages.
Boyce, "U.S. Office Action issued in copending U.S. Appl. No. 14/055,849, filed Oct. 16, 2013", dated Feb. 5, 2018, 15 pages.
"U.S. Office Action issued in copending U.S. Appl. No. 14/165,515, filed Jan. 27, 2014", dated May 30, 2018, 11 pages.
Boyce, "U.S. Office Action issued in copending U.S. Appl. No. 14/055,849, filed Oct. 16, 2013", dated Aug. 22, 2018, 11 pages.
"U.S. Office Action issued in copending U.S. Appl. No. 14/165,515, filed Jan. 27, 2014", dated Sep. 18, 2018, 8 pages.
"U.S. Office Action issued in copending U.S. Appl. No. 14/107,707, filed Dec. 16, 2013", dated Sep. 25, 2018, 17 pages.
Desai "U.S. Office Action issued in copending U.S. Appl. No. 14/316,481, filed Jun. 26, 2014", dated Nov. 14, 2018, 9 pages.
Desai "U.S. Office Action issued in copending U.S. Appl. No. 14/316,481, filed Jun. 26, 2014", dated Feb. 26, 2019, 8 pages.
"U.S. Office Action issued in copending U.S. Appl. No. 14/145,011, filed Dec. 31, 2013", dated Jan. 23, 2019, 8 pages.

(56) References Cited

OTHER PUBLICATIONS

Du et al., "Dynamic Vehicle Routing for Online B2C Delivery", Omega, vol. 33, No. 13, Feb. 2005, 13 pages.
"U.S. Office Action issued in copending U.S. Appl. No. 14/162,730, filed Jan. 23, 2014", dated Feb. 28, 2019, 18 pages.
Hetrakul "The Development of Efficient Delivery Routes in Extremely Short Product Life-Cycle Environments", The University of Missouri-Rolla, 2004, 192 pages.
"U.S. Office Action issued in copending U.S. Appl. No. 14/162,730, filed Jan. 23, 2014", dated Oct. 17, 2018, 12 pages.
Erb "U.S. Office Action issued in copending U.S. Appl. No. 14/165,515, filed Jan. 27, 2014", dated Apr. 16, 2019, 10 pages.

* cited by examiner

NEAR-TERM DELIVERY SYSTEM PERFORMANCE SIMULATION

CROSS REFERENCE TO RELATED APPLICATIONS

This application is a continuation-in-part of U.S. patent application Ser. No. 13/953,736, filed Jul. 29, 2013 and entitled "Near-term Delivery Local Online Shopping," which claims the benefit of both U.S. Provisional Patent Application No. 61/676,838, filed Jul. 27, 2012, entitled "Order Management," and U.S. Provisional Patent Application No. 61/773,132, filed Mar. 5, 2013, entitled "Lifestyle Courier Scheduling." The complete disclosure of each of the above-identified applications is hereby fully incorporated herein by reference.

FIELD OF THE TECHNOLOGY

The disclosed technology relates to online shopping. Example embodiments relate to event-driven performance simulation for a near-term delivery system.

BACKGROUND

"Electronic commerce" and "e-commerce," refer to buying and selling, and, in some instances, online delivery, of goods or services (hereinafter referred to as "products") enabled at least in part by electronic systems such as the Internet. Specifically, "online retailing" can be used when referring to business-to-consumer (B2C) e-commerce. Most online retailing involves product selection, ordering, and payment via a web browser, then order fulfillment, and finally delivery by conventional delivery services. Typically, the consumer is willing to incur a short delay in fulfillment (often on the order of a day or two), and a delay in delivery.

Typical delivery times are 3-5 business days (or longer if free delivery is selected), with shorter delivery times available for a premium. Delivery options include downloading (for software products), direct shipping from the online retailer, drop shipping (by-passing the online retailer's location and shipping the product directly from a manufacturer or distributor), and printing out or will-call (used primarily for tickets).

If the typical fulfillment and delivery latency is acceptable, then the location of the merchant typically does not matter to the consumer if delivery costs are relatively low. But in circumstances where one or more of the merchant location and delivery speed matter to the consumer, local online shopping may be used.

"Local shopping" when used in online retailing, can refer to activities that include responding to an online product query with the identity of one or more local brick-and-mortar stores that offer the product. The response typically includes store location, product price, product features, and current stocking level at each store location. Often, the product can be ordered online, and picked up at a local brick-and mortar location within a matter of minutes or hours. Or the user can visit the brick-and-mortar location to buy the product offline after locating the local merchant offering the product and confirming that the product is in stock at that location.

If the consumer wants delivery of a locally stocked product within a short time frame, for example the same day as ordering, then the consumer is typically limited to delivery from a single business (for example pizza delivery and dry cleaning pick up and delivery), or limited to delivery by a product category courier (for example, a multi-restaurant delivery service), or limited to delivery by a general courier, or limited to the use of errand labor auction service (for example, an online errand labor auction service).

SUMMARY

The technology described herein includes computer implemented methods, computer program products, and systems for near-term delivery system performance simulation. In some embodiments, an event queue can be received. The event queue includes unprocessed delivery system events, each event characterized by an event time. Until a stopping condition obtains, for an unprocessed event from the event queue characterized by the earliest event time, the technology can set a simulation time to the earliest event time. For an unprocessed event comprising a route planning event, the technology can request, and receive, route planning from a shipping system of the near-term delivery system. One or more events derivative can be identified from the unprocessed event. Each identified derivative event can be added to the event queue. The status of each of a plurality of agents can be updated as a function of identified derivative events and received route planning information. The updated status can be reported to the shipping system of the near-term delivery system. At least one simulated performance measure, such as percentage of on-time deliveries, can be determined based on characteristics of the agents over the simulation period. The performance measure(s) can be transmitted for display.

In some embodiments, identifying derivative events includes identifying events derived from received route planning information. In some embodiments, the shipping system is a production shipping system of the near-term delivery system. In some embodiments, the stopping condition is one or more of a predetermined simulation time, processing all events in the initial event queue, and a predetermined event. In some such embodiments, the predetermined event can include one of: the last system agent logging out, and the last drop off being completed.

These and other aspects, objects, features, and advantages of the example embodiments will become apparent to those having ordinary skill in the art upon consideration of the following detailed description of illustrated example embodiments.

DETAILED DESCRIPTION

Overview

Providing local online shopping with near-term delivery, especially using independent individual couriers, presents challenges not met by single-business delivery, product category couriers, general couriers, or errand labor auction services. Among those challenges is judging the effects on near-term delivery system performance as a result of changes in input and system configuration.

Turning now to the drawings, in which like numerals represent like (but not necessarily identical) elements throughout the figures, example embodiments of the present technology are described in detail.

Example System Architectures

Figure 1:
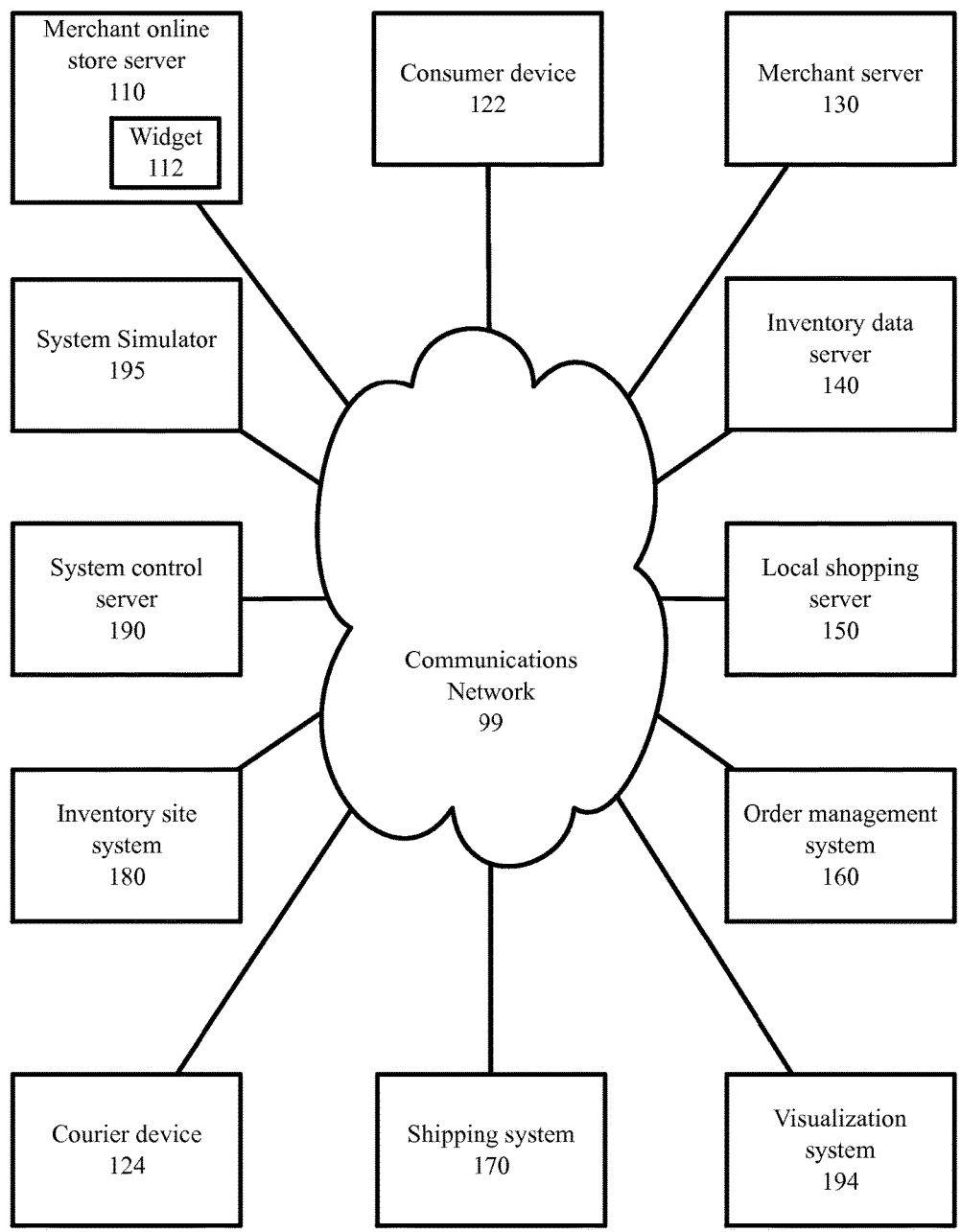
FIG. 1 is a diagram depicting a communications and processing architecture for near-term delivery system operation, in accordance with certain example embodiments.

Referring to FIG. 1, an example architecture for near-term delivery local online shopping 100 is illustrated. While each server, system, and device shown in the architecture is represented by one instance of the server, system, or device, multiple instances of each can be used. Further, while certain aspects of operation of the present technology are presented in examples related to FIG. 1 to facilitate enablement of the claimed invention, additional features of the present technology, also facilitating enablement of the claimed invention, are disclosed elsewhere herein.

As depicted in FIG. 1, the architecture 100 includes network devices 110, 122, 130, 140, 150, 160, 170, 124, 180, 190, 194, and 195; each of which may be configured to communicate with one another via communications network 99. In some embodiments, a user associated with a device must install an application and/or make a feature selection to obtain the benefits of the technology described herein.

Network 99 includes one or more wired or wireless telecommunications means by which network devices may exchange data. For example, the network 99 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network device can include a communication module capable of transmitting and receiving data over the network 99. For example, each network device can include a server, a desktop computer, a laptop computer, a tablet computer, a television with one or more processors embedded therein and/or coupled thereto, a smart phone, a handheld computer, a personal digital assistant (PDA), or any other wired or wireless processor-driven device. In the example embodiment depicted in FIG. 1, a merchant may operate network devices 110 and 130. A consumer may operate network device 122. A near-term delivery local shopping operator may operate devices 140, 150, 160, 170, 180, and 190. A courier may operate device 124.

The network connections illustrated are example and other means of establishing a communications link between the computers and devices can be used. Moreover, those having ordinary skill in the art having the benefit of the present disclosure will appreciate that the network devices illustrated in FIG. 1 may have any of several other suitable computer system configurations. For example, consumer device 122 may be embodied as a mobile phone or handheld computer may not include all the components described above.

In such an architecture 100, a merchant online store server 110 may be responsive to product information requests from a consumer device 122. For example, a consumer may use a consumer device 122 such as a tablet, a smartphone, or a personal computer to search for a specific camera on a retail merchant's online shopping server via either a web browser or via a native application running on the consumer device 122, in each case communicating with the merchant online store server 110 over network 99.

Additionally, a merchant may use a merchant system 130 to update an inventory data server 140 of the present technology with current inventory levels across one or more inventory sites associated with a given local zone. For example, a retail merchant may provide current inventory information from the point-of-sale (POS) system or inventory system of the merchant regarding quantities of the camera available in each of a plurality of the retail merchant's stores within a given set of ZIP codes including the current ZIP code of the consumer device. In some embodiments, a merchant may use a computing device of the merchant system 130 to capture an image of a product, or at least an image of a unique product identifier, such as a Universal Product Code (UPS) bar code. The inventory data server 140 can use product image recognition technology to relate the image to a product having information in a master catalog accessible to the inventory data server 140. Upon identifying the quantity of the product in stock at the particular merchant inventory site, the product can be made available to consumers in embodiments of the present technology.

As with the merchant online store server 110, a local shopping server 150 can be responsive to product information requests from the consumer device 122. For example, the consumer may use a consumer device 122 such as a tablet, a smartphone, or a personal computer to search for the camera on the online local shopping server 150 via either a web browser or a native application. The local shopping server 150 can respond with the availability of inventory in a given local zone. For example, a local shopping web site can respond to a request from the Internet browser of a consumer's tablet computer based on the local shopping operator's stock of the camera at inventory sites associated with the local zone, and based on current inventory information provided by one or more merchants having an inventory site (whether a retail store or a warehouse) associated with the local zone. For example, the local shopping server 150 can respond that the camera is available from three (3) inventory sites within the local zone—one (1) site being a merchant inventory site, two (2) sites being inventory sites of the local shopping operator.

A consumer may select a product using the consumer device 122, through either the merchant online store server 110 or the local shopping server 150 of the present technology. The order can be completed for near-term local delivery in conjunction with an order management system 160 of the present technology. For example, if the consumer used a web browser on a consumer device 122 to select the camera from the merchant's web site, a web widget 112 can provide functionality to connect the consumer device 122 with the order management system 160 to complete the order for local same day delivery. As another example, a browser extension installed on the consumer device 122 can be used to connect the consumer device 122 to the order management system 160 to complete the order for local same day delivery.

Completing the order can include confirming the availability of the product for specific delivery conditions such as time window and location. For example, the order management system 160 may determine, using the inventory data server 140, that while the camera is in stock at the three (3) inventory sites within the local zone, the camera is available for delivery within one hour from only one (1) of the inventory sites of the local shopping operator.

As another example, consider that the consumer may have interacted with a merchant online store server 110 and selected the camera in stock at the merchant's inventory site in the local zone. In that case, upon invoking the widget for interaction with the order management system 160 and specifying one-hour delivery, the order management system can determine that the camera, while in stock at the merchant's inventory site in the local zone (a retail store), cannot be delivered within one hour. The order management system 160 can then identify the one camera in its inventory that is available for delivery within one hour, and offer that camera as an alternative. While the continuing example describes an order for a camera, in embodiments of the present technology an order can include more than one product, and each product can be sourced from a different inventory site.

As part of completing the order, the order management server 160 can interact with a shipping system 170, to determine, for example, available courier resources that fit the delivery conditions specified by the consumer via the consumer device 122. As part of completing the order, the order management system 160 can interact with an inventory site system 180, to determine, for example, available inventory site resources to pick, checkout, pack, and otherwise prepare the order for pickup at the inventory site by an assigned courier.

The shipping system 170 can forecast the need for couriers, receive information regarding the cost, schedule, and capabilities of individual couriers, and schedule couriers for shifts based on the forecast and courier cost/schedule/performance information. For example, the shipping system 170 can use historical data to forecast order volume, and can use historical courier performance to forecast the courier capacity needed to meet the forecasted order volume. Cost information from couriers, each of whom can be an independent operator and have its own rate schedule, can be received as a function of a plurality of factors including zone location, time of day, type of cargo, etc. Information regarding capabilities of individual couriers can include characteristics such a dimension of maximum parcel that can be couriered, and whether the courier can transport products requiring refrigeration. Schedule information from couriers can include time frames available for active route assignment, time frame available for overflow or on-call route assignments, conditions under which a courier is available for emergency route assignments outside of active and on-call times, and time frames not available for assignment under any conditions.

Upon receiving a completed order for one or more products from the order management system 160, the shipping system 170 can determine routes and assign the determined routes to scheduled couriers. Each route can include the pickup and dropoff of one or more parcels containing products of an order. A route assignment can be communicated to a courier by the shipping system 170 via a courier device 124. For example, the pickup and dropoff of the camera can be assigned to a courier having an existing route passing the inventory site specified in the order for the camera.

While there may be several scheduled couriers that can be assigned to the route, some embodiments of the technology can use courier characteristics in choosing from among scheduled couriers. Courier characteristics can cover performance, cost, and status of each courier, and can include both objective information (such as percentage of on-time deliveries) and subjective information (such as ratings and reviews of couriers by stakeholders including consumers, merchants, and near-term local delivery system operator).

Upon completing an order, either the order management system 160 or the shipping system 170 can interact with the inventory site system 180 to assign and prioritize picking, checkout, packing, and other preparation for pickup by a courier for each product in the order. For example, the order management system 160 may have assigned the ordered camera to the single inventory site from which the camera can be delivered to the delivery location within an hour.

The inventory site system 180 can participate in prioritizing the picking, checkout, and packing of the products assigned to the inventory site, and can facilitate the efficiency of the process through both server applications, and product picker applications running on devices (not explicitly shown in FIG. 1) used by personnel to pick products. In some embodiments one or more of product picking, checkout, and packing can be automated. The inventory site system 180 can interface with the order management system 160 and the inventory data server to update inventory information for each inventory site. For example, in a merchant retail location that is an inventory site, a picker can use a computing device that incorporates a bar code reader or image recognition capabilities to log products collected from the inventory site for checkout.

In particular, inventory site system 180 can facilitate the assembly of checkout-friendly collections of product identifiers so that checkout on a picked order goes quicker. For example, at a merchant inventory site without a highly integrated checkout system (such as an existing brick-and-mortar retail store), the inventory site system 180 can facilitate collecting Universal Product Code (UPC) barcodes that can be printed and scanned by conventional checkout scanners without having to physically scan each product at the checkout. At inventory sites with slightly more automated checkout systems, a list of UPC numbers collected during picking can be transmitted to the checkout system by an element of the inventory site system 180 for processing at checkout. This approach can lower the cost of integrating a traditional brick-and-mortar merchant retail location into a near-term delivery local shopping system.

In some embodiments one or more of inventory site system 180, order management system 160, shipping system 170, local shopping server 150 (or merchant online store server 110), and consumer device 122 can interact to authorize and execute an product swap or an inventory site transfer. For example, when an ordered product is determined to be out of stock by a picker, based on permissions obtained from the consumer via the consumer device the product can be swapped for an acceptable equivalent available at the same inventory site, or the order for the product can be transferred to another inventory site. In either event, the technology can determine if rescheduling or rerouting is required, and can perform any required rescheduling and rerouting.

The order management system 160, shipping system 170, courier devices 124, and inventory site system 180 can interact to obtain information regarding a delivery status of an order (including the delivery status of individual products in the order). For example, a courier device 124 in the possession of a courier can determine and provide geolocation information, and information on the identity of parcels, orders, and products that have been picked up by the courier. The shipping system 170 can receive such information, and estimate the time of arrival of the package based on inputs such as: route (including parcel pick ups and drop offs on the route); traffic, weather, and events in the local zone; and performance history of the courier. Such information can be used to respond to a delivery status query from the consumer device 122 to any one of the merchant online store 110, the local shopping server 150, the order management system 160, the shipping system 170, or the inventory site system 180—though typically such queries can be forwarded to the shipping system 170.

In some embodiments, interaction between the shipping system 170 and the courier devices 124 allows the shipping system to re-plan routes dynamically. For example, pickup of the camera from the inventory site, and dropoff of the camera at the delivery destination can be added to an existing route.

In some embodiments, courier devices 124 can obtain geolocation-oriented images of route features, such as the approach to a pickup or dropoff point, and can receive annotations of such images, for example in the form of metadata or tags. The tagged geolocation-oriented images can be made available to other couriers to facilitate efficient route execution. Courier score points can be awarded to couriers who add useful information to the collection of tagged geolocation-oriented images. For example, several different couriers can contribute tag information to an image, submitted by a first courier, of the overhead wires partially obstructing an entrance to the loading dock at a particular inventory site. Subsequent couriers having that inventory site as a stop on an assigned route can either consult the data store of tagged geolocation-oriented images using a courier device 124, or a series of applicable images and metadata can be made available to a courier via the courier device 124 when a route assigned to the courier includes the inventory site.

A system control server 190 can be used so that system operators may receive signals from each other device, server, and system described herein, and edit or direct the operation thereof in accordance with the policies of the technology operator.

A system simulator 195 can be used to practice the technology described below. For example, the capacity of a configured shipping system to accept additional orders can be determined, and the same day delivery system can be operated in accordance with the determined capacity. A visualization system 194 can provide visualization of historical, present, and predicted future characteristic of one or more couriers, including courier position.

Example Embodiments

The example embodiments illustrated in the following figures are described hereinafter with respect to the components of the example operating environment and example architecture described elsewhere herein. The example embodiments may also be performed with other systems and in other environments.

In some embodiments, the system simulator 195 can model a same day delivery shipping system, and predict how such a system may behave in real-world scenarios. The technology can be used to demonstrate viability of a same day delivery system in particular geographies—for example, by predicting required resources and costs to run the system reliably in those geographies. The technology can be used to aid in quantitatively identifying sources of inefficiency (on both a logistical and software level), and allow modeling of the impact of alternative logistical strategies before testing them in the real world.

In some embodiments, the technology can be used to estimate the cost of adding additional features to the same day system before offering them to customers, merchants, couriers, etc. The technology can aid in selecting the location of hubs and determining when and how long courier and hub operator work shifts should last. The technology can assess the reliability of the system, and overall effect of various types of unforeseen events (vehicle breakdowns, much higher than expected traffic, courier late signing on, etc.).

The users of the disclosed technology include, but are not limited to: shipping system developers, who may use it to analyze and improve routing algorithms and processes; and product managers who make deals with external merchants, to understand costs associated with adding features, merchants, etc. Further, courier managers and hub operator managers may use the disclosed technology when determining when to schedule work shifts.

In some embodiments, code of the technology can consist of a single binary run from a command line of a computing device. When run, the code can read a configuration file to determine simulation details, for example, number of orders, number of couriers, etc. The code can then run the simulation for a specified period of time (for example, a single day), placing orders at the appropriate times and modeling the behavior of the entities characterized by behavior external to the simulation (for example, human agents). The simulation can run from the time the first order is placed to the time the last courier logs off. While it is running, it can log output (at a configurable level of verbosity) that can indicate the status of the simulation, and actions that the various agents are taking. Such a simulation can record events needed to determine the high-level output metrics (for example percentage of on-time deliveries) that the simulation operator cares about. When finished, such embodiments can display the higher-level data results of the simulation to the user, and will exit.

In some embodiments, the system simulator 195 does not run for an indefinite period of time: it runs for a fixed period of time, and then exit when the simulation is finished. One consequence of this approach in such embodiments is that there may be some work left unfinished at the end of the simulation (returns in flight, packages not delivered), which can be highlighted in the simulation's output.

Operation of the system simulator can be characterized in several stages: scenario generation, simulation running, and results collection/analysis. These stages can be run sequentially as part of single binary invocation.

The scenario generation stage can be characterized as a pre-processing step to the simulation running stage. In the scenario generation stage, a configuration file is created. The configuration file specifies the parameters of the simulation, and details a scenario for the simulation to be run. The scenario encapsulates the details of the merchants, stores, orders, returns, couriers, etc. which are to be modeled in the simulation. To generate the scenario, data from configuration files, production servers, and/or historical transactions can be used.

The simulation running stage runs the simulation, using the scenario as input. This stage places orders, returns, and such in the system at the appropriate times, and models the behavior of various human agents of the system (couriers, hub operators, customers, and store clerks) and externals such as traffic.

The results collection/analysis stage can derive metrics such as total cost (and profit) of running the system and percentage of deliveries on time. Other metrics include time couriers spend on various activities (driving, pickups, drop offs, etc.), and a measure of flexibility, such as capacity for additional deliveries, remaining in the system. This component has the task of collecting and presenting this information to the user.

In addition to these three stages, a forecasting stage can predict the number of couriers and hubs operators that will be need to meet demand for future days. The forecasting stage can run as a batch process in production, running independently for each zone, taking the past history of the online near term delivery system as input (including orders placed, courier travel times, and many other parameters), outputting a number of planned courier and hub shifts that should be used to meet predicted demand in that zone (as well as the expected metrics for the day: expected number of orders, profit, etc.).

Figure 2:
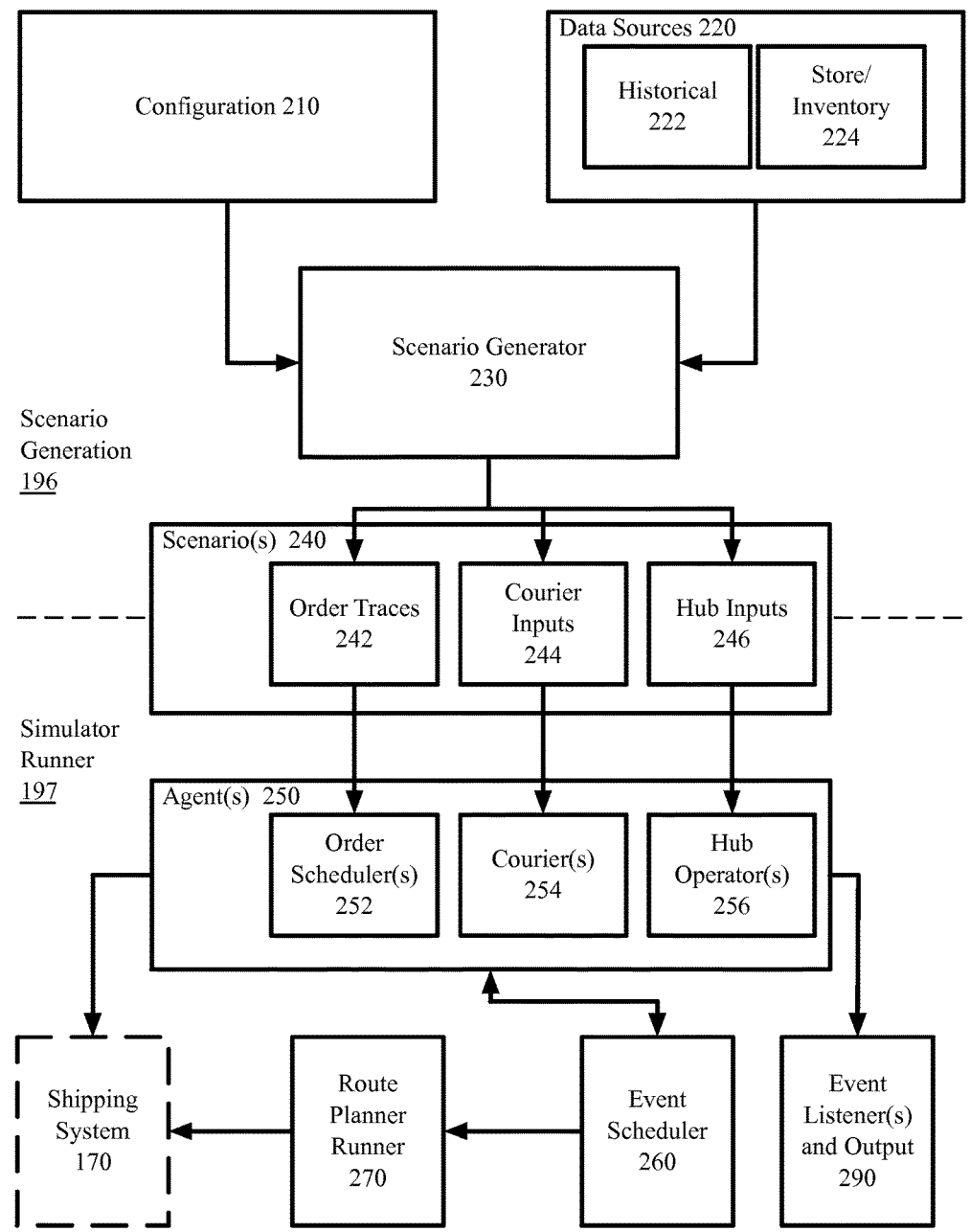
FIG. 2 is a diagram depicting a notional architecture for near-term delivery system performance simulation, in accordance with certain example embodiments.

Referring to FIG. 2, and continuing to refer to FIG. 1 for context, the scenario generation stage 196 and simulation runner stage 197 of an architecture for the system simulator 195 of a near-term delivery local online shopping system in accordance with embodiments of the present technology are illustrated. In such an architecture, the scenario generation stage 196 can include the transformation, using the scenario generator 230, from a simple human-editable configuration 210 to a much more detailed scenario 240 suitable for the simulator runner 197 to act upon. The configuration 210 allows a user to specify parameters for generating an appropriate input (for example, order traces 242), and also allows the user to specify that the scenario 240 should include data from other data sources 220, for example historical data 222 and store/inventory data 224, stored by production servers.

Desirable characteristics of the one or more scenarios 240 include thoroughness, and being agnostic to input source. With regard to thoroughness, the data fully specifies the requirements of the simulation runner 197 and the resources available to the simulator runner 197. With few exceptions, the simulator runner 197 should not need to fetch input data from sources beyond those explicitly specified in the scenario 240, though exceptions can be made where dynamic responses are needed, such as driving directions from an external map system. With regard to being agnostic to input source, the scenario 230 data can be generated programmatically or come from historical production data 222. TABLE 1 provides example parameters types included in a scenario.

TABLE 1

Example Scenario Parameters

Courier Shifts: start/end times, starting
location, type of vehicle used
Vehicles: vehicles have different capacities,
driving and handoff times
Hubs: location, physical capacity, ingress/egress
turnaround time
Hub shifts
Stores: pack/pickup/dropoff time distributions,
fill rate estimator, merchant ID,
Initial system state: parcels starting in hubs and vehicles
Order Trace/Return Trace -list of orders/returns to be placed,
with placement timestamp, merchant/item mapping,
order type (delivery, pickup in store, etc.),
delivery window, delivery address
Cancellation Trace
Item rejection trace
Traffic multipliers for times throughout the day (or just
use maps traffic adjustments, if it can give us estimates,
or some hybrid of the two)
Exceptional events: vehicle breakdowns, parcels
lost, mistakes made by couriers, etc.
Routing algorithm and algorithm-specific
configuration
Cost model: cost per hour for couriers/hub
operators, hub space, vehicle depreciation In some embodiments, a probabilistic model can characterize each input. For example, in practice, driving times can vary by a certain amount based on various factors. Rather than using average driving times as input and assuming that each route takes the average time, embodiments of the disclosed technology can employ a distribution class that can be used to represent a distribution of times, and generate random values as the simulation specified by the appropriate distribution.

Desirable characteristics of the scenario generator 230 include allowing changes to high-level simulator parameters easily (for example, number and distribution of orders, and courier hours); using production data and custom specified data interchangeably (for example, allowing use of yesterday's orders and couriers with a completely different routing algorithm); allowing use of production data with minor modifications (for example, re-run yesterday's simulation, but remove a certain store). Such an approach allows comparing output metrics between two sets of input for which the difference can be controlled.

In some embodiments, the system simulator includes a configuration language that allows the user to specify the parameters such as those of TABLE 2.

TABLE 2

Example Parameters Specifiable in the System Simulator

Total number of orders
Fraction of orders that are pickup-in-store, signature
required,
etc.
Distribution specifying number of store orders per order
Return fraction
Available delivery windows, and their relative popularity
Order placement time windows, and their relative popularity
Order placement lead time
Start/end time for courier shifts, and number of
couriers working shifts for that hour TABLE 2-continued Example Parameters Specifiable in the System Simulator Locations of hubs, and hub hours/shifts
Cost model One function of the scenario generator 230 is computing traces (for example, order trace 242) that satisfy the higher-level parameters of the configuration file 210. There are multiple ways of generating orders that satisfy the input constraints. For example, in some embodiments, a random seed is provided by the input as well. This approach ensures that the technology can provide consistent results for debugging, and also can run the simulation on multiple scenarios that match the given input criteria (for example, to determine how the results can vary for a given set of inputs). Other parameters, such as the cost model, can be used directly in the resulting scenario without being modified.

One advantage of specifying only the number of orders, and specify the remaining configuration parameters in terms of relative popularity/weights, is that it becomes easier to scale the inputs to the system and determine how such scaling affects the results of the system without having to explicitly change other parameters. This will make it easier to adjust the total number of orders, for example, while maintaining the same relative popularity of merchants seen in production.

Desirable characteristics of a configuration file 210 format for embodiments of the present technology include: a familiar, concise, easy-to-understand syntax; the ease with which an existing configuration can be changed with small modifications; the ease with which syntax errors can be identified and fixed; and the ability to represent common abstractions (for example, the relative popularity of different objects) succinctly.

Java Object Script Notation (JSON), XML (Extensible Markup Language), XSL (Extensible Stylesheet Language), Python, and Java are each a good candidate for configuration file 210 format. Example embodiments disclosed herein use Java as the language for configuration files. An example configuration file 210 in Java is shown in TABLE 3.

Several sources of real-world history for an online shopping near-term delivery system can be used in creating a scenario 240, including: order and return traces 242, courier inputs 244, hub inputs 246, and information about merchants/stores available in a zone. Using abstractions, specifying that data for the scenarios should come from production can be straightforward, and only require a single line of configuration. Overriding or extending production data with small modifications (like adding or removing a store/merchant) can be performed using the configuration file.

Some simulation configuration, for example start time and length of courier/hub operator shifts, can be specified explicitly. Other simulation configuration, for example merchant/store data, can be imported from production sources. Other examples of data imported from production sources includes: the number of merchants in a zone (and stores for that merchant); the number of orders placed for each merchant; the distribution of total cost for store orders placed for this merchant; individual store hours; the fill rate of each store; the return rate of orders from each store; the number of times chosen as a pickup-in-store location in a day; the distribution of number of packages (and physical package size) per store order; and the distribution of pickup/dropoff times at store. Hubs have some attributes that are similar to stores.

TABLE 3

Example Configuration File in Java

```
config.setNumOrders(50);
config.setReturnFraction(0.1); //10% return rate.
// Order and return windows.
WeightedMap<TimeWindow> orderWindows = WeightedMap.of(
    newTimeWindow("9am", "11am"), 40,
    newTimeWindow("11am", "1pm"), 30,
    newTimeWindow("1pm", "3pm"), 20,
    newTimeWindow("3pm", "4pm"), 10);
assertWeightSumEquals(100, orderWindows);
config.setOrderWindows(orderWindows);
// For now, reuse the weight for each order window for the return
windows. config.setReturnWindows(orderWindows);
// Delivery windows.
WeightedMap<TimeWindow> deliveryWindows = WeightedMap.of(
    newTimeWindow("1pm", "5pm"), 40,
    newTimeWindow("5pm", "9pm"), 60);
assertWeightSumEquals(100, deliveryWindows);
config.setDeliveryWindows(deliveryWindows);
// Merchants per order.
WeightedMap<Integer> merchantsPerOrderMap = WeightedMap.of(
    1, 80,
    2, 10,
    3, 5,
    4, 5);
assertWeightSumEquals(100, merchantsPerOrderMap);
config.setMerchantsPerOrder(
    distFactory.newWeightedMapDistribution(merchantsPerOrderMap));
// Items per merchant.
WeightedMap<Integer> itemsPerMerchantMap = WeightedMap.of(
    1, 10,
    2, 20,
    3, 30,
    4, 25,
    5, 15);
assertWeightSumEquals(100, itemsPerMerchantMap);
config.setItemsPerMerchant(
    distFactory.newWeightedMapDistribution(merchantsPerOrderMap));
// Lead times.
config.setMinOrderLeadTime(parseDuration("1h"));
config.setMinReturnLeadTime(parseDuration("1h"));
config.setMaxReturnLeadTime(parseDuration("24h"));
// Store hours
config.setStoreHours(parseInterval("8am", "8pm"));
```

Besides using the historical data directly, the scenario generator 230 can extrapolate larger or smaller data sets based on historical input. This functionality facilitates forecasting, and enables the technology to answer questions such as "what happens when order volume in this zone doubles?" One approach to extrapolation is to convert the production data to the model used for scenario generation (for example, the types of inputs specified in the configuration file 210), and then use that model to generate orders as if the orders were specified directly. When performing this extrapolation, some embodiments avoid reusing the same customer address for multiple different orders by using transaction data from other sources (through checkout, trusted stores, etc.), so the technology can use customer addresses from a larger data set than the historical data used as input for the extrapolation.

Once a scenario 240 has been generated, the simulation runner 197 can be invoked to run the simulation. The simulation runner can use the shipping system production code 170 (which can be linked into the simulator binary) in order to provide instructions to the simulated agents 250 (including the order scheduler 252, couriers 254, and hub operators 256).

As mentioned above, the simulator runner 197 can accept input types that correspond to probability distributions of parameters such as the duration of various actions. This approach provides an element of randomness to the simulator runner 197. The random seed for the simulator runner 197 can be specified in the input configuration, so results should be repeatable (with the exception of backend responses, for example, from maps).

The simulation runner 197 employs abstractions for events, an event scheduler 260, and agents 250. An event is an abstraction of something that will occur at some point in time. An event contains a single method that is invoked to perform the event. An event scheduler 260 is used to schedule events to occur at the appropriate time. When a simulation is first run, for example, each order in the scenario's order trace 242 has an event scheduled to place the order in the system at the appropriate time. The simulation runner retrieves the unused event with the earliest timestamp. The simulation time is set to the time of that event. The event handler is run, adding any additional events, for example events that result from the retrieved event. After this, the simulation stopping condition is checked.

An agent 250 is a model of a human person working in the near-term delivery online shopping system, which schedules events that correspond to the actions that this person might take. As an example, a courier agent 254 would periodically request a list of assigned tasks, drive toward the required pickup/dropoff points, perform pickups/drop offs, send position updates, etc.

A single simulation can begin with orders and returns being scheduled into the system and can end when the last courier or hub operator logs off (though in some embodiments, some orders may remain "in flight"). Agents 250 are scheduled to log into their shifts at the appropriate time, and continue performing their assigned tasks as directed by the production shipping code 170. Each agent 240 log out when their tasks are done (which may be earlier or later than the scheduled logoff time). In some embodiments, multiple simulations are run using one or more random variables from a corresponding distribution for reach variable so that simulation population statistics can be derived.

In some embodiments, the simulation runner 197 is single threaded. The event model can be modified slightly to allow for multiple events to run in parallel. For example, if each event reported that it must happen in some time range, rather than at a specific time, multiple events with overlapping time ranges can be run at the same time. In some embodiments, route planning is run on a separate thread from the rest of the simulation runner 197.

For scheduling packages, planning routes, etc., the simulation runner 197 can use a public shipping system 170 application programming interface (API), with the production API implementation linked into the binary. The simulation runner 197 can schedule events into the shipping system 170, for example, using the route planner runner 270 in the same way that the production system would: merchant-to-store resolution, reservations, and pack notifications can each be performed by the simulator at the appropriate time. A periodic planning event can be scheduled in the event scheduler 260 to update the schedule, emulating the periodic re-planning of the production shipping service 170.

Each courier agent 254 drives toward its destination using realistic routes and driving directions. For this, the technology can use remote procedure calls (RPCs) to external map servers to provide driving directions and time estimates. Each courier agent 254 can be configured to follow the directions exactly, and will use the time estimates along with noise specified by the scenario to determine driving times.

Handoff time distributions can vary per-location. In a model used by some embodiments, a fixed handoff time (which represents parking time, and time to get to the appropriate location once parked) and an incremental per-handoff time. In some embodiments, the technology can model contention for hub resources, for example if multiple courier vehicles are present, and can distinguishing between different vehicle types. Couriers 254 and hub operators 256 are modeled to take breaks (for example lunch, and periodic rests). In some embodiments, exception events, such as a courier departing from a recommended route, lost packages, incorrect pick ups/drop offs, vehicle breakdowns, and road closures can be modeled.

In some embodiments, simulation performance data is collected for analysis while the simulation is running, using one or more event listeners 290. Event listener classes can be notified when certain events occur. The event listener 290 can take immediate action in response to these events (for example, logging the event to a text file), or store the event internally and perform an aggregation of events when the simulation finishes. When the simulation is finished, the event listeners 290 can be invoked to dump any final output. The types of events that event listeners can be notified of include: order/return placement notifications; order packed notifications, parcel scans (for example at each pick up and drop off); courier and hub operator sign on/sign off events; break begins/ends; updates in courier position; courier begins travelling to a destination; courier parks at destination.

Besides the events, some metadata about the simulation can be recorded as well. This data includes the time the simulation was run, the person who ran it, and some of the high-level scenario data: zone, number of orders, expected start/end times of courier shifts, type of routing algorithm used, cost model, etc.

A "report" is a collection of data objects generated by running an algorithm over the recorded events. These report objects can be implemented as Java objects. A construct can be added to reports to allow for persistence. Reports can be generated as a post-processing step of the system simulator 195. Classes implementing Event Listener 290 can be used to generate these reports. "Cost metrics" is one example of a report. This would provide accessors for metrics such as the total amount of money spent running the network, total amount spent on hubs, total amount spent on couriers, and total profit. Another type of report is "courier time distribution", which would compute the amount of time each individual courier spent travelling, performing handoffs, etc. Other reports can provide data on factors such as: the number of orders/store orders/packages delivered on time, early, and late; the fraction of time courier/hub operator spends on various activities; used versus free hub and vehicle capacity over time; the number of packages picked up per time a store is visited; the number of packages in hubs at beginning and end of day; and the available delivery capacity, as reported by the system.

Reports from multiple scenarios can be aggregated. For example, a single scenario configuration can be used to create different order-level scenarios. Reports from running these scenarios can be aggregated, and population statistics, including confidence intervals can be determined.

Consider, as a continuing example, a single order and a single courier. The order is placed at 7:00 a.m. on a given day, and must be delivered between 8:00 a.m. and 10:00 a.m. on that same day. The simulator runner 197 is configured to plan routes every 10 minutes, and pack orders 20 minutes after the order is placed. The simulation period runs from 7:00 a.m.-10:00 a.m., and courier agents request updated routes and report location every 5 minutes. The performance measure will be the percentage of on-time delivery. In the case of the continuing example, this performance measure will be either 0% or 100%. These parameters correspond to the configuration 210 of the system simulator 195 for the continuing example.

Figure 3:
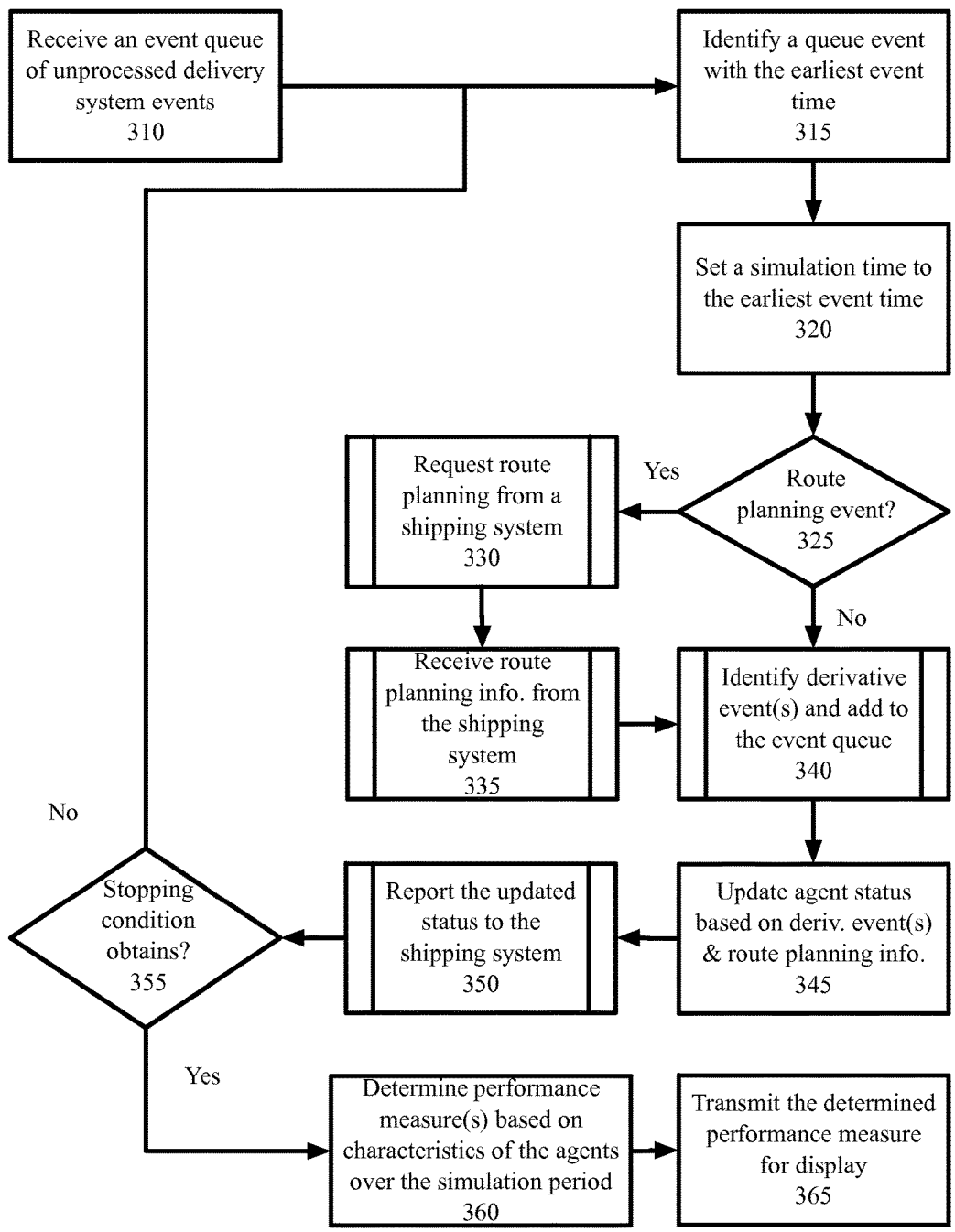
FIG. 3 is a diagram depicting methods for near-term delivery system performance simulation in accordance with certain example embodiments of the present technology.

Referring to FIG. 3, and continuing to refer to prior figures for context, example methods 300 for near-term delivery system performance simulation in accordance with embodiments of the present technology are illustrated. In such methods, embodiments of the disclosed technology can receive an event queue—Block 310. The received event queue can include a plurality of unprocessed delivery system events, with each event characterized by an event time. In the continuing example the initial event queue is shown in TABLE 1.

TABLE 1

Initial Event Queue

| EVENT | TIME |
| --- | --- |
| Place order | 7:00 a.m. |
| Plan routes | 7:00 a.m. |
| Courier1 sign in | 8:00 a.m. |

Iteratively, until a stopping condition obtains, embodiments of the technology can take the following approach. The technology can identify an unprocessed event with the earliest event time—Block 315. In the continuing example both "Place order" and "Plan routes" occur at 7:00 a.m. In some embodiments, where more than one event is characterized by the earliest time, the technology can use a predetermined priority to decide which event to process first. In the continuing example, "Place order" events are processed before "Plan route" events having the same event time.

The simulation time is set to the event time of the earliest unprocessed event—Block 320. In the continuing example, the simulation time is set to 7:00 a.m. If the unprocessed event is a route planning event, Block 325 "Yes" path, then the technology can request route planning from a shipping system, Block 330, and then receive route planning information from the shipping system—Block 335. If the unprocessed event is not a route planning event, Block 325 "No" path, and after receiving route planning information from the shipping system, then the technology can identify derivative events and add those derivative events to the queue—Block 340. In the continuing example, the "Place order" event is removed form the event queue, and a "Pack order" event is added at 7:20 a.m. per the configuration 210 of the continuing example. The current event queue is shown in TABLE 2.

TABLE 2

Event Queue—Iteration 2

| EVENT | TIME |
| --- | --- |
| Plan routes | 7:00 a.m. |
| Pack order | 7:20 a.m. |
| Courier1 sign in | 8:00 a.m. |

The status of each near-term delivery system agent can be updated as a function of identified derivative events and received route planning information—Block 345. The updated status can be reported to the shipping system 170—Block 350. In the continuing example, the simulator runner 187 can inform the shipping system 170 that the order has been placed, and will be packed by 7:20 a.m. In this instance, the simulator runner 197 is simulating the operation of the inventory site system 180.

Embodiments of the technology can test whether a predetermined stopping condition obtains—Block 355. If no, Block 355 "No" path, the technology can identify the queue event with the earliest time—Block 315. In the continuing example, the stopping condition is the expiration of the simulation time, which is 10:00 a.m., so the stopping condition does not obtain. The queue event with the earliest time is "Plan routes." The technology sets the simulation time to 7:00 a.m. (which was the simulation time in the first iteration). While the next event in the queue is "Plan routes," since there are no packages to deliver or couriers available, no routes will be requested or planned. A new "Plan route" event will be derived, based on the rules of the continuing example, for 7:10 a.m. The current event queue is shown in TABLE 3.

TABLE 3

Event Queue—Iteration 3

| EVENT | TIME |
| --- | --- |
| Plan routes | 7:10 a.m. |
| Pack order | 7:20 a.m. |
| Courier1 sign in | 8:00 a.m. |

In the continuing example, the first event in the queue is once again "Plan routes," and there are still no courier or packages, therefore the only actions are setting the simulation time to 7:10 a.m. and identification of a subsequent "Plan routes" event at 7:20 a.m. The current event queue is shown in TABLE 4.

TABLE 4

Event Queue—Iteration 4

| EVENT | TIME |
| --- | --- |
| Pack order | 7:20 a.m. |
| Plan routes | 7:20 a.m. |
| Courier1 sign in | 8:00 a.m. |

In this iteration, "Pack Order" is the next event in the queue. The simulator runner 197 notifies the shipping system that the order has been packed and sets the simulation time to 7:20 a.m. In this role, the simulator runner 197 is simulating the role of the inventory site system 180. The current event queue is shown in TABLE 5.

TABLE 5

Event Queue—Iteration 5

| EVENT | TIME |
| --- | --- |
| Plan routes | 7:20 a.m. |
| Courier1 sign in | 8:00 a.m. |

In the continuing example, planning events are encountered every 10 minutes, but since no couriers are available, the only activity in the simulation is to reschedule a "Plan routes" event in 10-minute increments until 8:00 a.m. The stopping condition, simulation time equal to 10:00 a.m. is not encountered.

TABLE 6

| Event Queue—Iteration 9 | |
| --- | --- |
| EVENT | TIME |
| Plan routes | 8:00 a.m. |
| Courier1 update | 8:05 a.m. |
| Courier1 sign out | 4:00 p.m. |

During the ninth iteration, the "Courier1 sign in" event is processed, and generates the derivative events including a "Courier update" at 8:05, and a "Courier sign out" at 4:00 p.m. Note that the "Courier sign out" is beyond the simulation period. Events beyond the simulation period can be scheduled, or they can be ignored.

In the next iteration, "Plan routes" is the first event in the queue. There is an available order packed at 7:20 a.m., and courier signed in at 8:00 a.m. In accordance with Blocks 325, 330, and 335, a route is requested from, and received from the shipping system. The shipping system assigns the route to Courier1. Since the order cannot be delivered until 9:00 a.m., the courier is instructed to pick up the package, but is not yet instructed to deliver the package. TABLE 7 shows the events in the queue at this point.

TABLE 6

| Event Queue—Iteration 10 | |
| --- | --- |
| EVENT | TIME |
| Courier1 update | 8:05 a.m. |
| Plan routes | 8:10 a.m. |
| Courier1 sign out | 4:00 p.m. |

In the next iteration, "Courier1 update" is the next item in the queue. The simulation runner 197 notifies the shipping system 190 with a simulated courier position, and requests an updated route. A "Courier1 update" is scheduled for 8:10 a.m.

TABLE 6

| Event Queue—Iteration 11 | |
| --- | --- |
| EVENT | TIME |
| Courier1 update | 8:10 a.m. |
| Plan routes | 8:10 a.m. |
| Courier1 sign out | 4:00 p.m. |

In iteration 12, a "Plan routes" event occurs, but has no effect. In iteration 13, the "Courier1 update" event is encountered, the simulation runner 197 updates Courier1's position by 5 minutes of travel time. Courier1 updates and route planning occur at 5 minute and 10 minute intervals respectively, until Courier1 arrives at the pickup location and the order pickup is reported to the shipping system 170 by the simulation runner 197. The courier begins making simulated progress to the delivery destination, performing update events every 5 minutes. The delivery is reported at 9:30 a.m. The simulation continues with empty route planning until 10:00 a.m. when the simulation runner 197 encounters the stopping condition—Block 335, "Yes" path.

FIG. 3 illustrates the determination of performance measures based on characteristics of the agents over the simulation period after the stopping condition obtains—Block 360. Such is the case in the continuing example, where the percentage of on-time deliveries can be determined from the status of the Courier1 agent over time. In other embodiments, data for performance measures are collected incrementally during each iteration. The simulation runner 197 can transmit the collected performance data for display—Block 365. In the continuing example, 100% of deliveries were on-time, and such measure is transmitted to a graphical user interface of a computing device in the system controller server 190, from which a user initiated the simulation.

Figure 4:
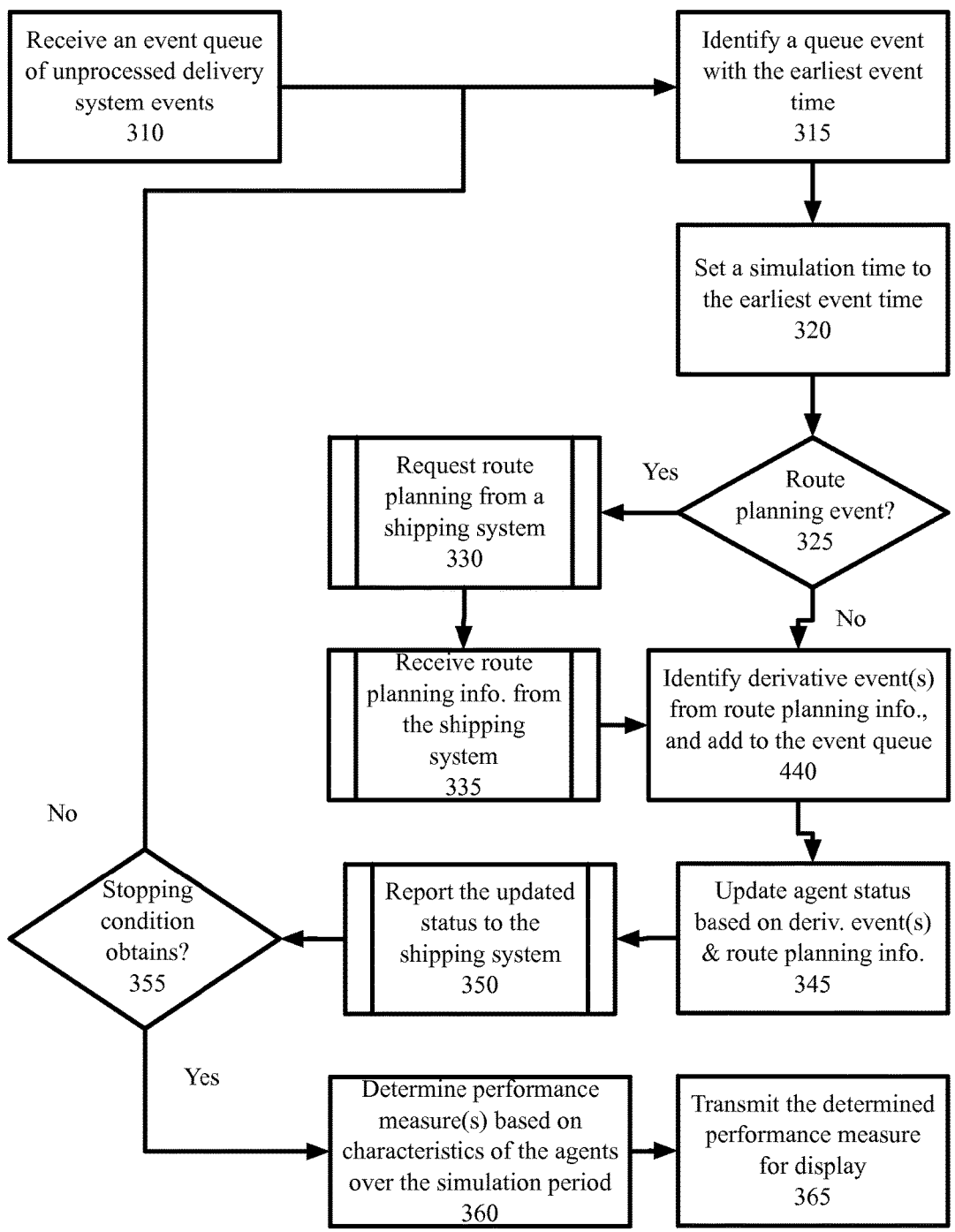
FIG. 4 is a diagram depicting methods for near-term delivery system performance simulation in accordance with certain example embodiments of the present technology.

Referring to FIG. 4, and continuing to refer to prior figures for context, example methods 400 for near-term delivery system performance simulation in accordance with embodiments of the present technology are illustrated. In such methods Blocks 310-335 and 345-365 are performed as described elsewhere herein. In such methods, route planning information informs the identification of derivative events—Block 440. For example, pick up and delivery events can be influenced by the characteristics of the planned route.

Figure 5:
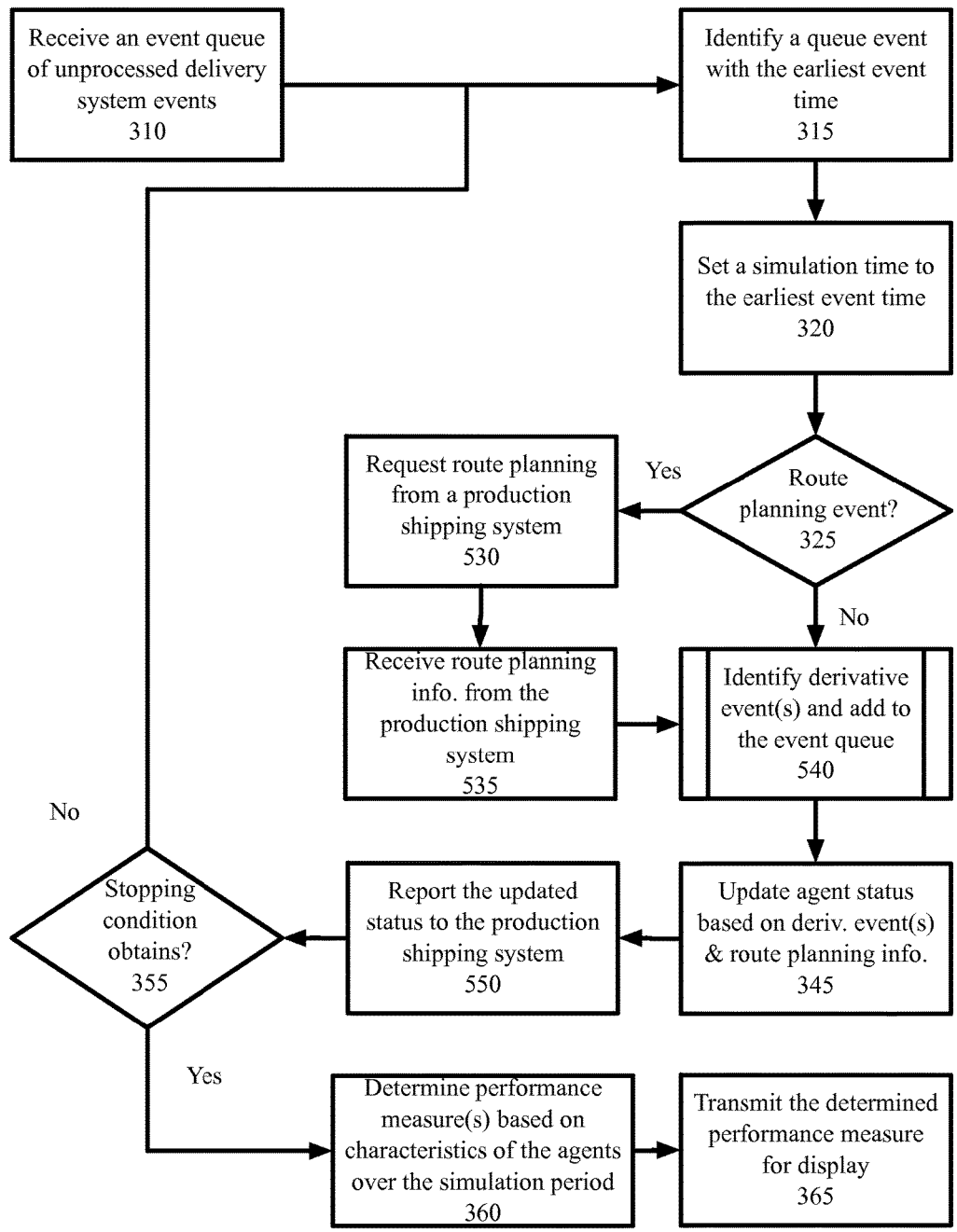
FIG. 5 is a diagram depicting methods for near-term delivery system performance simulation in accordance with certain example embodiments of the present technology.

Referring to FIG. 5, and continuing to refer to prior figures for context, example methods 500 for near-term delivery system performance simulation in accordance with embodiments of the present technology are illustrated. In such methods Blocks 310-325 and 345-365 are performed as described elsewhere herein. In such methods, the shipping system from which route planning is requested, Block 530, and received, Block 535, and from which derivative events are identified, Block 540, is the production shipping system.

Figure 6:
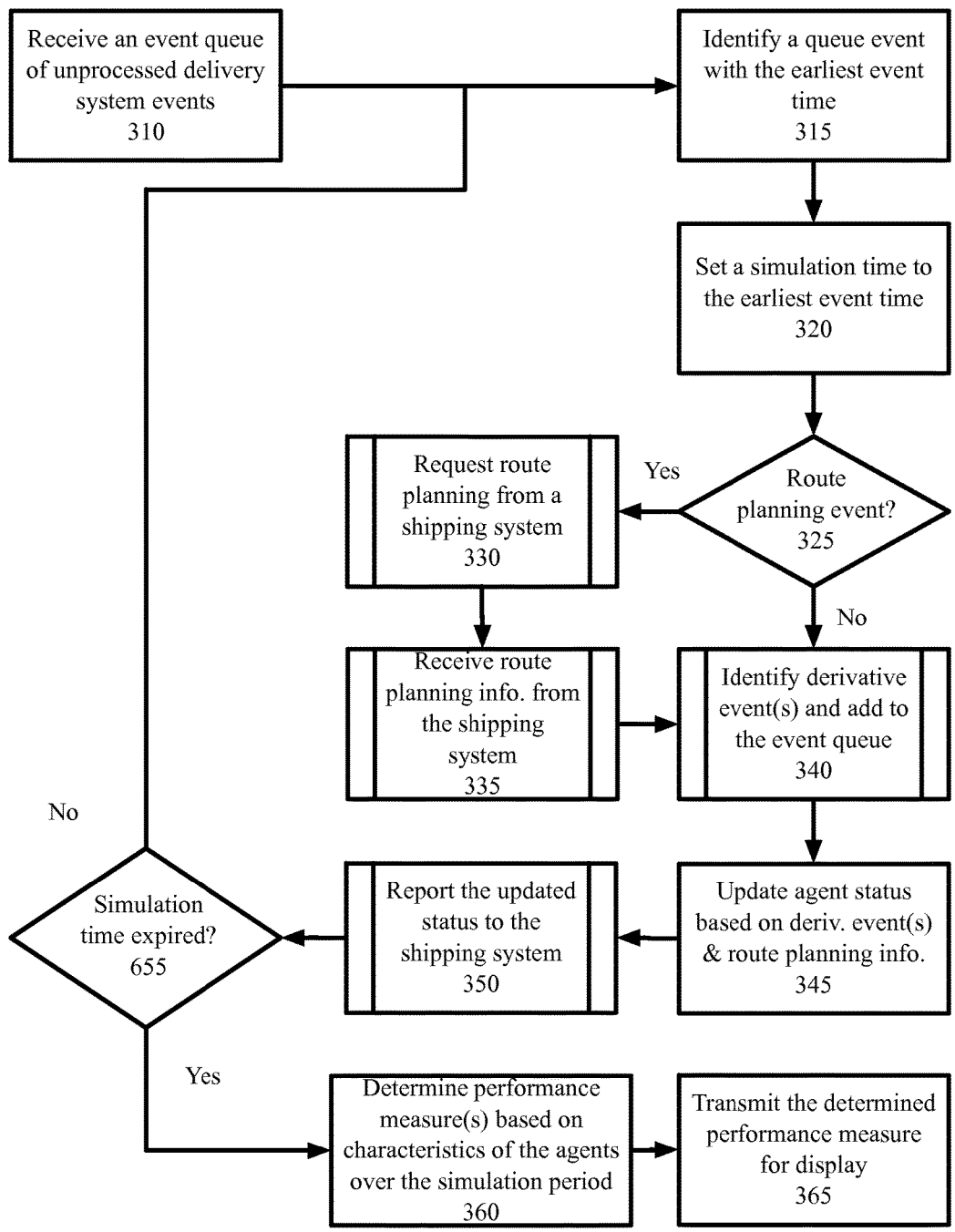
FIG. 6 is a diagram depicting methods for near-term delivery system performance simulation in accordance with certain example embodiments of the present technology.

Referring to FIG. 6, and continuing to refer to prior figures for context, example methods 600 for near-term delivery system performance simulation in accordance with embodiments of the present technology are illustrated. In such methods Blocks 320-350, 360, and 365 are performed as described elsewhere herein. In such methods, as in the continuing example, a predetermined simulation time is the stopping condition—Block 655.

Figure 7:
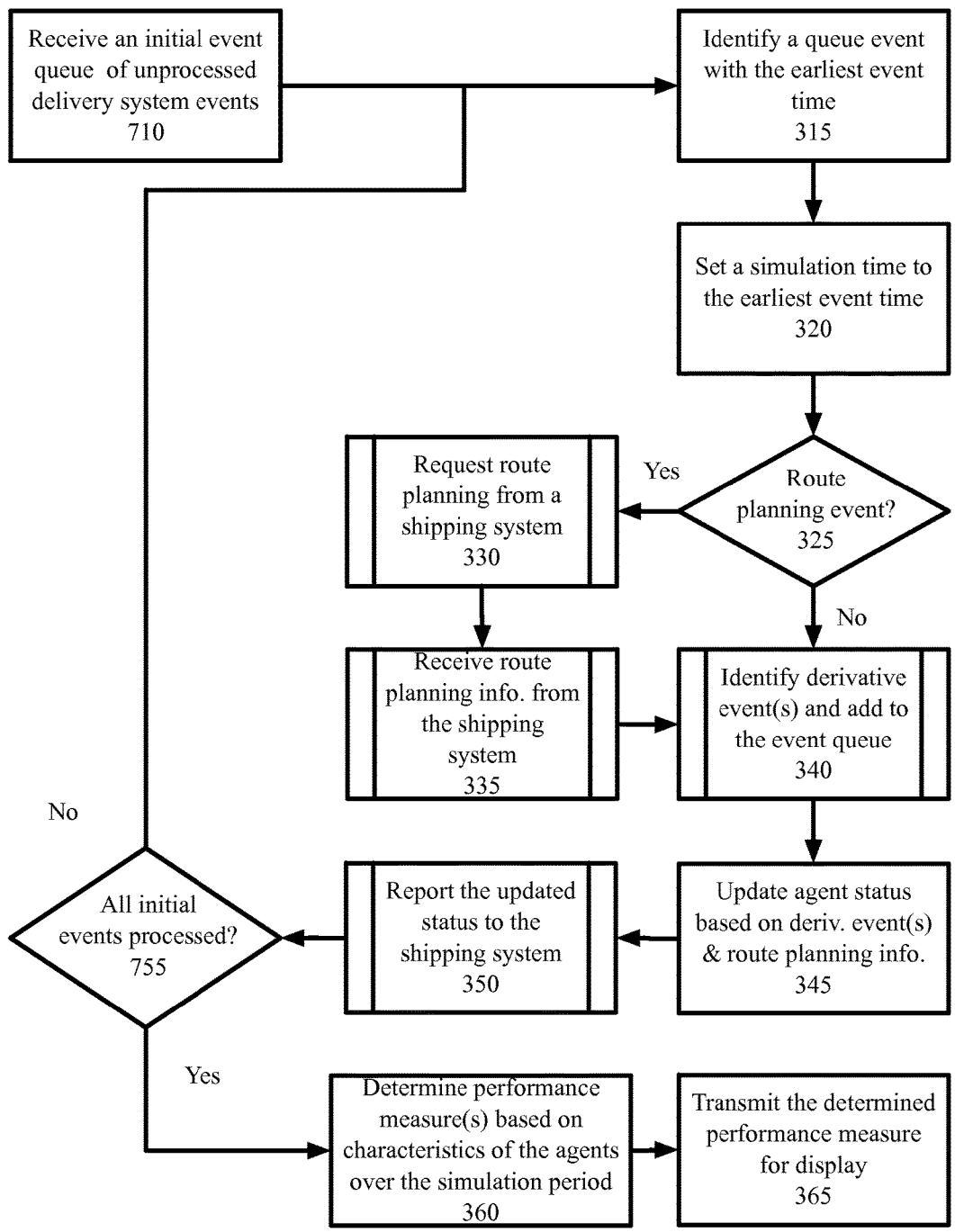
FIG. 7 is a diagram depicting methods for near-term delivery system performance simulation in accordance with certain example embodiments of the present technology.

Referring to FIG. 7, and continuing to refer to prior figures for context, example methods 600 for near-term delivery system performance simulation in accordance with embodiments of the present technology are illustrated. In such methods Blocks 320-350, 360, and 365 are performed as described elsewhere herein. In such methods, as in the continuing example, processing of all events in the initial event queue is the stopping condition—Block 755.

Figure 8:
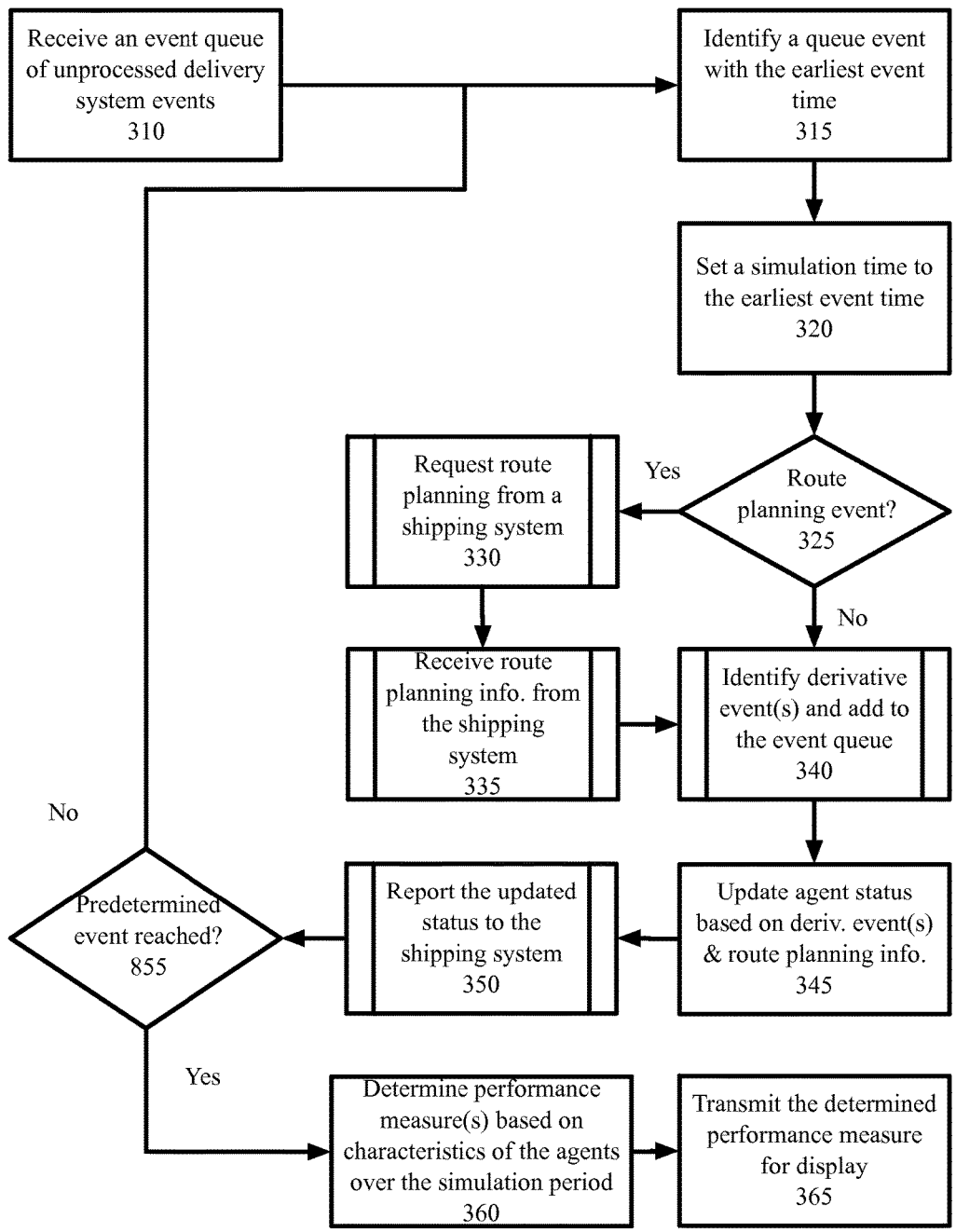
FIG. 8 is a diagram depicting methods for near-term delivery system performance simulation in accordance with certain example embodiments of the present technology.

Referring to FIG. 8, and continuing to refer to prior figures for context, example methods 600 for near-term delivery system performance simulation in accordance with embodiments of the present technology are illustrated. In such methods Blocks 320-350, 360, and 365 are performed as described elsewhere herein. In such methods, as in the continuing example, processing of a specific predetermined event is the stopping condition—Block 855. For example, delivery of a predetermined quantity of packages.

Other Example Embodiments

Figure 9:
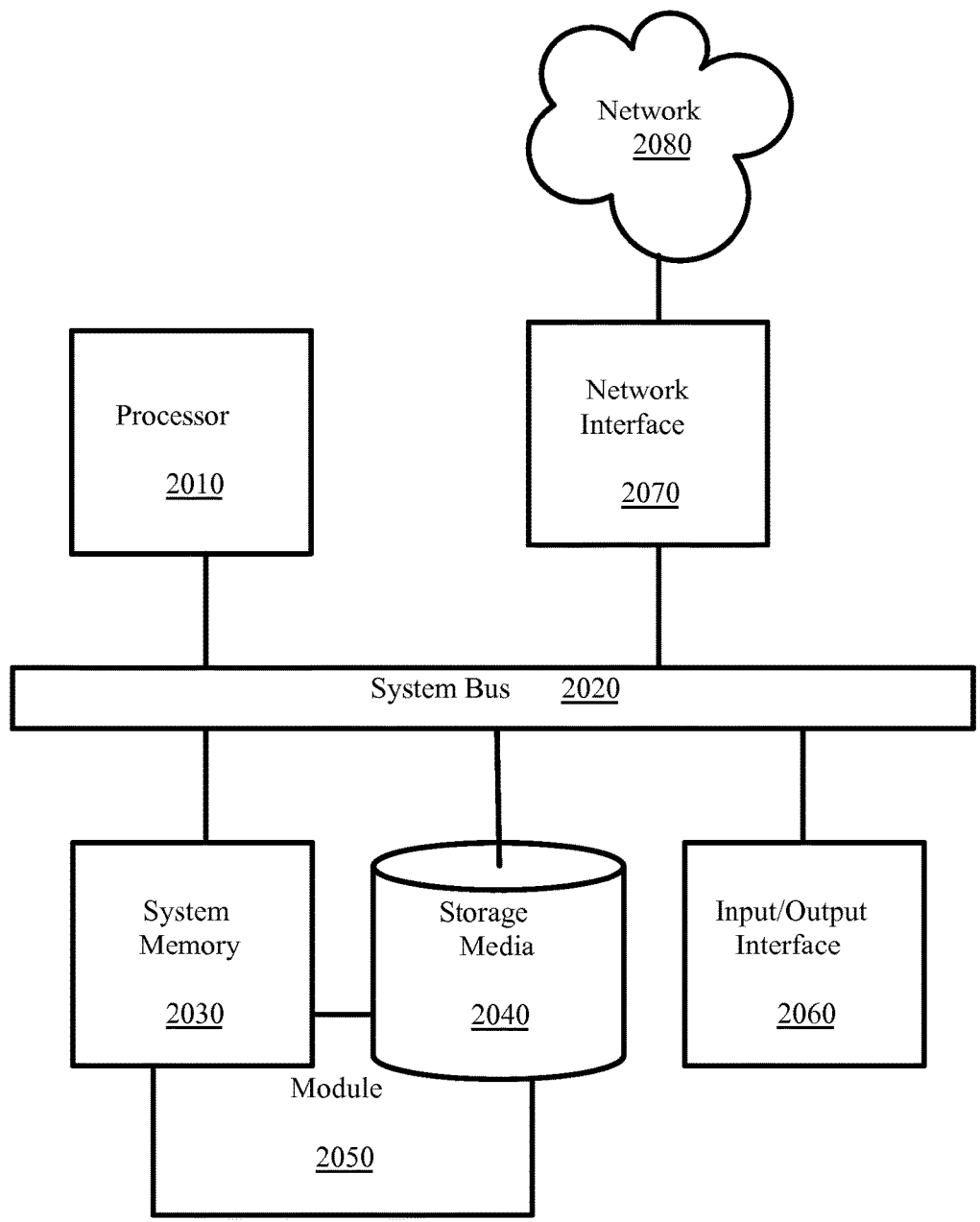
FIG. 9 is a block diagram depicting a computing machine and a module, in accordance with certain example embodiments.

FIG. 9 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device, for example, a system on chip (SOC), system on package (SOP), or ASIC device.

In situations in which the technology discussed here collects personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (for example, to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the technology described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures. For example, in some embodiments, the technology can organize submissions as a wiki, in which case any given location can have a single collaboratively edited entry, and courier scores can be credited in a fashion used to accredit contributors to other wikis. In some embodiments, the data store of submissions is curated, for example to remove obsolete, erroneous, or otherwise inappropriate submissions. In some embodiments, a submission is recommended from among the current submissions for a location based on one or more figures of merit such as a courier score of the submitting courier and a rating of the submission.

We claim:

1. A computer-implemented method to simulate near-term delivery system performance, the method comprising:
   receiving, by one or more computing devices, an event queue comprising a plurality of unprocessed delivery system events, each event characterized by an event time, and the plurality of events generated from a random seed;
   iteratively, until a stopping condition obtains, for an unprocessed event from the event queue characterized by the earliest event time:
      setting, by the one or more computing devices, a simulation time to the earliest event time;
      processing, by the one or more computing devices, the unprocessed event, wherein processing comprises:
         for an unprocessed event comprising a route planning event:

requesting, by the one or more computing devices, route planning from a shipping system of a near-term delivery system; and
receiving, by the one or more computing devices, route planning information from the shipping system of the near-term delivery system in response to requesting route planning;
identifying, by the one or more computing devices, one or more events derivative from the unprocessed event, and adding the identified derivative events to the event queue;
updating, by the one or more computing devices, the status of each of a plurality of agents as a function of the identified derivative events and the received route planning information;
reporting, by the one or more computing devices, the updated status to the shipping system; and
determining, by the one or more computing devices, whether the stopping condition obtains;
determining, by the one or more computing devices, at least one simulated performance measure based on characteristics of the agents over the simulation period; and
transmitting, by the one or more computing devices, the determined performance measure for display.

2. The method of claim 1, wherein identifying derivative events comprises identifying events derived from the received route planning information.

3. The method of claim 1, wherein the shipping system is a production shipping system.

4. The method of claim 1, wherein the stopping condition comprises a predetermined simulation time.

5. The method of claim 1, wherein the received event queue is an initial event queue, and the stopping condition comprises processing all events in the initial event queue.

6. The method of claim 1, wherein the stopping condition comprises a predetermined event.

7. The method of claim 6, wherein the predetermined event comprises one of: a last system agent logging out, wherein a system agent is one of a courier or a hub operator; and a last drop off being completed.

8. A computer program product, comprising:
a non-transitory computer-readable storage device storing computer-executable program instructions thereon that, upon execution by a computer, cause the computer to simulate the performance of a near-term delivery system, by performing a method comprising:
receiving an event queue comprising a plurality of unprocessed delivery system events, each event characterized by an event time, and the plurality of events generated from a random seed;
iteratively, until a stopping condition obtains, for an unprocessed event from the event queue characterized by the earliest event time:
setting a simulation time to the earliest event time;
processing the unprocessed event, wherein processing comprises:
for an unprocessed event comprising a route planning event:
requesting route planning from a shipping system of the near-term delivery system; and
receiving route planning information from the shipping system of the near-term delivery system in response to requesting route planning;
identifying one or more events derivative from the unprocessed event, and adding the identified derivative events to the event queue;
updating the status of each of a plurality of agents as a function of the identified derivative events and the received route planning information;
reporting the updated status to the shipping system; and
determining whether the stopping condition obtains;
determining at least one simulated performance measure based on characteristics of the agents over the simulation period; and
transmitting the determined performance measure for display.

9. The computer program product of claim 8, wherein identifying derivative events comprises identifying events derived from the received route planning information.

10. The computer program product of claim 8, wherein the shipping system is a production shipping system.

11. The computer program product of claim 8, wherein the stopping condition comprises a predetermined simulation time.

12. The computer program product of claim 8, wherein the received event queue is an initial event queue, and the stopping condition comprises processing all events in the initial event queue.

13. The computer program product of claim 8, wherein the stopping condition comprises a predetermined event.

14. The computer program product of claim 13, wherein the predetermined event comprises one of: a last system agent logging out, wherein a system agent is one of a courier or a hub operator; and a last drop off being completed.

15. A computing system to operate delivery systems, comprising:
a storage device; and
a processor communicatively coupled to the storage device, wherein the processor executes application code instructions that are stored in the storage device to cause the computing system to:
receive an event queue comprising a plurality of unprocessed delivery system events, each event characterized by an event time, and the plurality of events generated from a random seed;
iteratively, until a stopping condition obtains, for an unprocessed event from the event queue characterized by the earliest event time:
set a simulation time to the earliest event time;
process the unprocessed event, wherein processing comprises:
for an unprocessed event comprising a route planning event:
requesting route planning from a shipping system of a near-term delivery system; and
receiving route planning information from the shipping system of the near-term delivery system in response to requesting route planning;
identify one or more events derivative from the unprocessed event, and adding the identified derivative events to the event queue;
update the status of each of a plurality of agents as a function of the identified derivative events and the received route planning information;
report the updated status to the shipping system; and
determine whether the stopping condition obtains;
determine at least one simulated performance measure based on characteristics of the agents over the simulation period; and
transmit the determined performance measure for display.

16. The computing system of claim 15, wherein identifying derivative events comprises identifying events derived from the received route planning information.

17. The computing system of claim 15, wherein the shipping system is a production shipping system.

18. The computing system of claim 15, wherein the received event queue is an initial event queue, and the stopping condition comprises processing all events in the initial event queue.

19. The computing system of claim 15, wherein the stopping condition comprises a predetermined event.

20. The computing system of claim 19, wherein the predetermined event comprises one of: a last system agent logging out, wherein a system agent is one of a courier or a hub operator; and a last drop off being completed.

* * * * *